US012067907B2

United States Patent
Takano et al.

(10) Patent No.: US 12,067,907 B2
(45) Date of Patent: Aug. 20, 2024

(54) POSITION INFORMATION ACQUISITION DEVICE, HEAD-MOUNTED DISPLAY, AND POSITION INFORMATION ACQUISITION METHOD

(71) Applicant: Sony Interactive Entertainment Inc., Tokyo (JP)

(72) Inventors: Akihiro Takano, Tokyo (JP); Yoshihiro Myokan, Tokyo (JP); Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/044,853

(22) PCT Filed: Sep. 23, 2020

(86) PCT No.: PCT/JP2020/035866
§ 371 (c)(1),
(2) Date: Mar. 10, 2023

(87) PCT Pub. No.: WO2022/064576
PCT Pub. Date: Mar. 31, 2022

(65) Prior Publication Data
US 2023/0335024 A1  Oct. 19, 2023

(51) Int. Cl.
*G09G 3/00* (2006.01)
*G01S 17/08* (2006.01)
*G06F 3/01* (2006.01)

(52) U.S. Cl.
CPC ............ *G09G 3/001* (2013.01); *G01S 17/08* (2013.01); *G06F 3/012* (2013.01); *G09G 2354/00* (2013.01)

(58) Field of Classification Search
CPC .... G09G 3/001; G09G 2354/00; G01S 17/08; G01S 17/06; G01S 17/89; G06F 3/012; G06F 3/011; G02B 27/02
See application file for complete search history.

(56) References Cited

U.S. PATENT DOCUMENTS

| | | | |
|---|---|---|---|
| 6,847,425 | B2 | 1/2005 | Honda |
| 6,906,793 | B2 | 6/2005 | Bamji |

(Continued)

FOREIGN PATENT DOCUMENTS

| | | | |
|---|---|---|---|
| JP | 7103727 | A | 4/1995 |
| JP | 2004085529 | A | 3/2004 |

(Continued)

OTHER PUBLICATIONS

International Search Report for corresponding PCT Application No. PCT/JP2020/035866, 5 pages, dated Dec. 8, 2020.

(Continued)

*Primary Examiner* — Amit Chatly
(74) *Attorney, Agent, or Firm* — Matthew B. Dernier, Esq.

(57) ABSTRACT

Pulsed light emitted from a light emitter of a TOF sensor at an intensity is divided into light that is reflected by an object having transmissivity and reaches a light receiver at an intensity and light that passes through the object and reaches an object at an intensity. The latter is reflected by the object at an intensity, partly passing through the object to reach the light receiver at an intensity. A local maximum point is detected in a change in a degree of photons observed by the light receiver, to acquire both distances to the object and the object.

9 Claims, 18 Drawing Sheets

(56) References Cited

U.S. PATENT DOCUMENTS

| | | |
|---|---|---|
| 7,333,183 B2 | 2/2008 | Shoji |
| 8,610,808 B2 | 12/2013 | Prescher |
| 9,030,676 B2 | 5/2015 | Murakami |
| 9,733,066 B2 | 8/2017 | Kasai |
| 10,026,212 B2 | 7/2018 | Donner |
| 10,691,405 B2 | 6/2020 | Miyazaki |
| 10,778,952 B2 | 9/2020 | Bleyer |
| 11,079,478 B2 | 8/2021 | Perenzoni |
| 11,500,076 B2 | 11/2022 | Keilaf |
| 2003/0223053 A1 | 12/2003 | Liu |
| 2004/0051860 A1 | 3/2004 | Honda |
| 2007/0131844 A1 | 6/2007 | Shoji |
| 2011/0249148 A1* | 10/2011 | Prescher ............... H04N 23/84 348/E9.053 |
| 2013/0329234 A1 | 12/2013 | Murakami |
| 2016/0131473 A1 | 5/2016 | Kasai |
| 2017/0148206 A1 | 5/2017 | Donner |
| 2019/0018117 A1 | 1/2019 | Perenzoni |
| 2019/0271767 A1 | 9/2019 | Keilaf |
| 2019/0277948 A1 | 9/2019 | Ning |
| 2019/0294410 A1* | 9/2019 | Miyazaki ............... G06F 3/01 |
| 2022/0043153 A1* | 2/2022 | Smeeton ............... G01S 17/10 |

FOREIGN PATENT DOCUMENTS

| | | |
|---|---|---|
| JP | 2007183246 A | 7/2007 |
| JP | 2011007616 A | 1/2011 |
| JP | 2012049547 A | 3/2012 |
| JP | 2012513694 A | 6/2012 |
| JP | 2014086394 A | 5/2014 |
| JP | 2015017811 A | 1/2015 |
| JP | 2017219383 A | 12/2017 |
| JP | 2019032305 A | 2/2019 |
| JP | 2019506015 A | 2/2019 |
| JP | 2019152616 A | 9/2019 |
| JP | 2020504291 A | 2/2020 |
| WO | 2012115083 A1 | 8/2012 |
| WO | 2018105552 A1 | 6/2018 |

OTHER PUBLICATIONS

Dr. David Horsley, "World's first MEMS ultrasonic time-of-flight sensors" TDK Technologies & Products Press Conference 2018. URL: https://www.tdk-electronics.tdk.com/download/2431644/7219af118484fa9afc46dc1699bacca/02-presentation-summary.pdf> 3 pages, Jan. 2018 (for relevancy, see Instant Specification).

International Search Report for related PCT Application No. PCT/JP2020/036074, 6 pages, dated Nov. 10, 2020.

* cited by examiner

FIG. 1
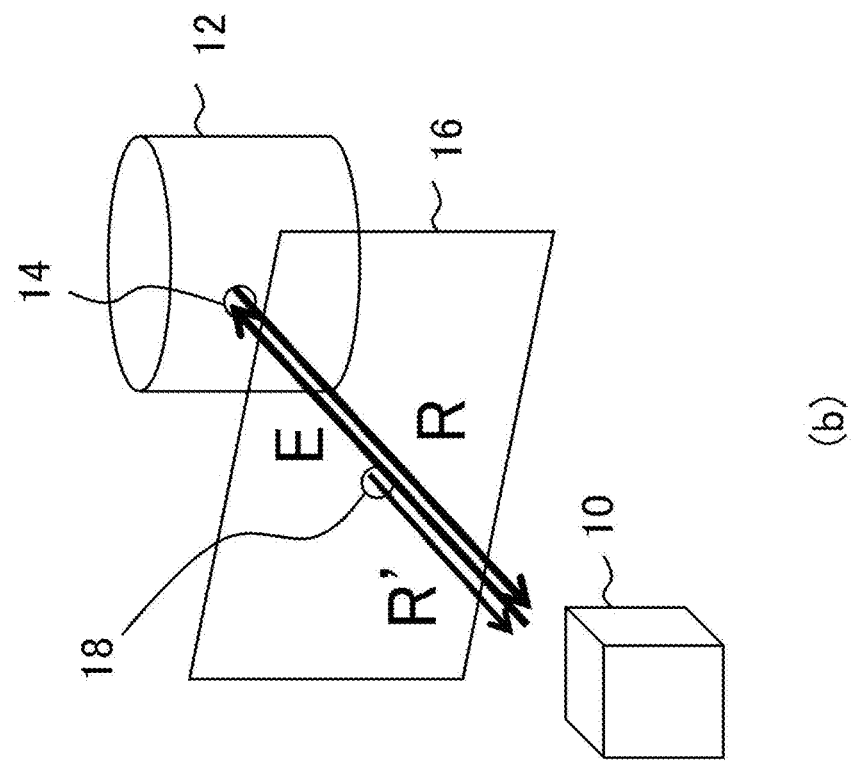
(b)
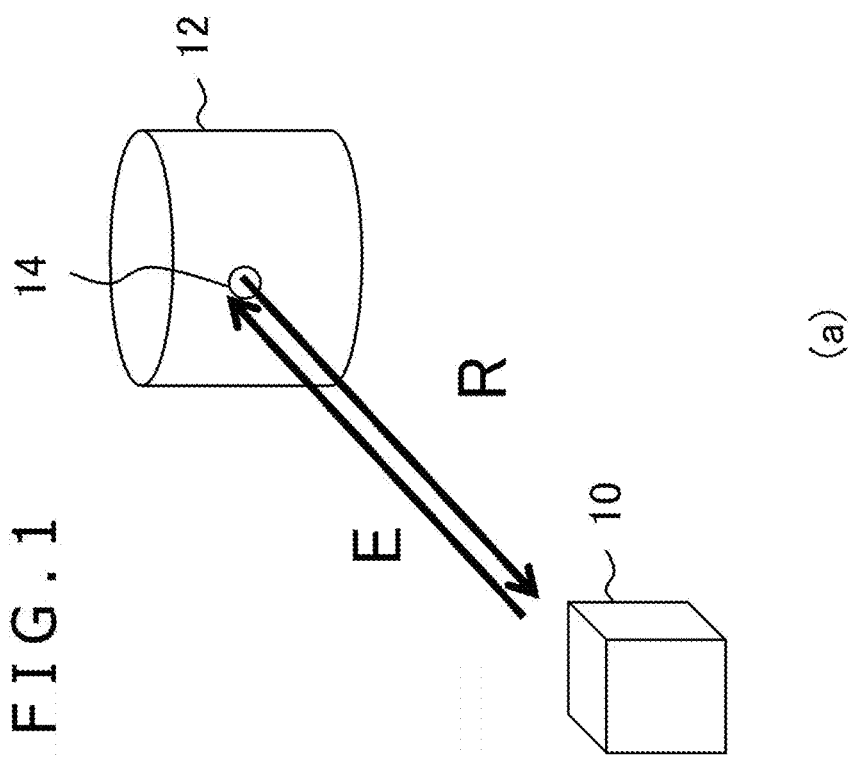
(a)

(a)  (b)

FIG.15
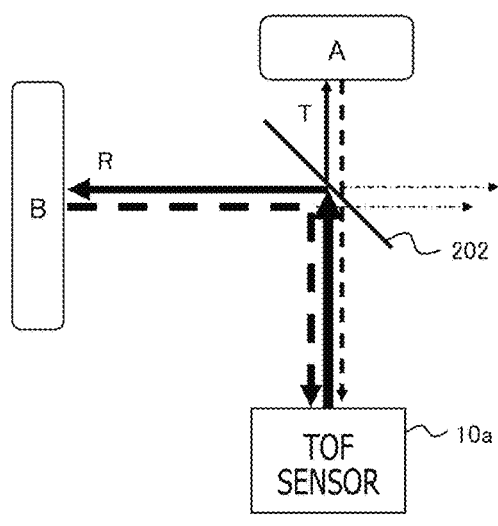 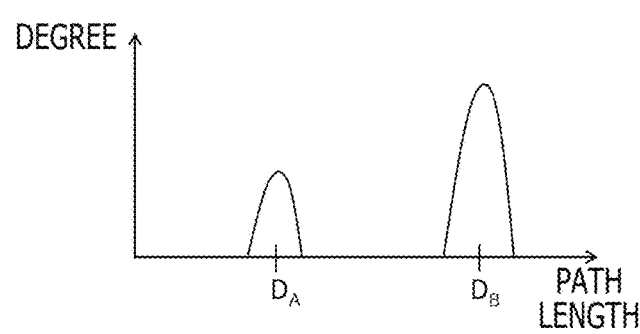
(a)　　　　　　　　　　　　(b)

POSITION INFORMATION ACQUISITION DEVICE, HEAD-MOUNTED DISPLAY, AND POSITION INFORMATION ACQUISITION METHOD

TECHNICAL FIELD

The present invention relates to a position information acquisition device, a head-mounted display, and a position information acquisition method that acquire position information regarding an object in the real space.

BACKGROUND ART

Technologies for acquiring a position or a motion of a real object and performing information processing or issuing a warning according to the position or the motion of the real object have been used in a wide range of fields such as electronic content, robotics, automobiles, monitoring cameras, unmanned aerial vehicles (drones), and IoT (Internet of Things). For example, in the field of electronic content, a motion of a user with a head-mounted display on is detected and progress is made on a game according to the motion of the user, to reflect the motion in a displayed virtual world, which makes it possible to provide an immersive virtual experience.

One of the technologies for acquiring position information regarding a real object is LiDAR (Light Detection and Ranging). LiDAR is a technology of applying light to irradiate a real object and observing the reflected light to derive a distance to the real object. LiDAR includes dToF (direct Time of Flight) that determines a distance on the basis of a time difference between the irradiation with pulsed light and the observation of the reflected light and iToF (indirect Time of Flight) that determines a distance on the basis of a periodically changed phase difference of light, which have been put to practical use (for example, see PTL 1, PTL 2, and NPL 1).

CITATION LIST

Patent Literature

[PTL 1] Japanese Patent Laid-Open No. 2019-152616, [PTL 2] Japanese Patent Laid-Open No. 2012-49547
[NPL 1] Dr. David Horsley, "World's first MEMS ultrasonic time-of-flight sensors, [online], TDK Technologies & Products Press Conference 2018, [searched on July 8, Reiwa 2], Internet <URL: https://www.tdk-electronics.tdk.com/download/2431644/f7219afl18484fa9afc46dc1699bacca/02-presentation-summary.pdf>

SUMMARY

Technical Problem

Scenes where information regarding a position or a motion of an object present in the real space is used are supposed to become increasingly diverse in the days to come. Accordingly, a technology capable of easily obtaining a lot of information in a diversity of environments irrespective of a material or a position relation of an object has been required.

The present invention is made in view of the above problem, and an object thereof is to provide a technology capable of easily acquiring position information regarding an object in a variety of environments.

Solution to Problems

An aspect of the present invention relates to a position information acquisition device. The position information acquisition device includes a degree observer configured to acquire a temporal change in a degree of photons resulting from a pulsed irradiation light being reflected by an object, a distance acquirer configured to detect a local maximum point in the temporal change in the degree and acquire a distance to the object on the basis of a time point at which the local maximum point appears, and a data output unit configured to output information regarding the distance.

Another aspect of the present invention relates to a head-mounted display. The head-mounted display includes the above-described position information acquisition device and a display panel configured to acquire, from the data output unit, information regarding a distance to an object in a field of vision corresponding to an orientation of a face of a user and display, on the basis of the information, a result of applying an independent process to each of a transmissive object and a non-transmissive object that overlap in the field of vision.

A still another aspect of the present invention relates to a position information acquisition method. The position information acquisition method includes a step of acquiring a temporal change in a degree of photons resulting from a pulsed irradiation light being reflected by an object, a step of detecting a local maximum point in the temporal change in the degree and acquiring a distance to the object on the basis of a time point at which the local maximum point appears, and a step of outputting information regarding the distance.

It should be noted that any combination of the above components and conversion of the expression of the present invention between methods, devices, and the like are also effective as aspects of the present invention.

Advantageous Effect of Invention

According to the present invention, it is possible to easily acquire position information regarding an object in a variety of environments.

BRIEF DESCRIPTION OF DRAWINGS

FIG. 1 depicts diagrams each illustrating by way of example an environment where a TOF sensor of a first embodiment acquires a distance to a target.

FIG. 15 is a diagram for explaining the principle of identifying a local maximum point of a degree of photons by making a difference of a predetermined value or more between the transmittance and the reflectance of the one-way mirror in the second embodiment.

DESCRIPTION OF EMBODIMENTS

First Embodiment

Figure 2:
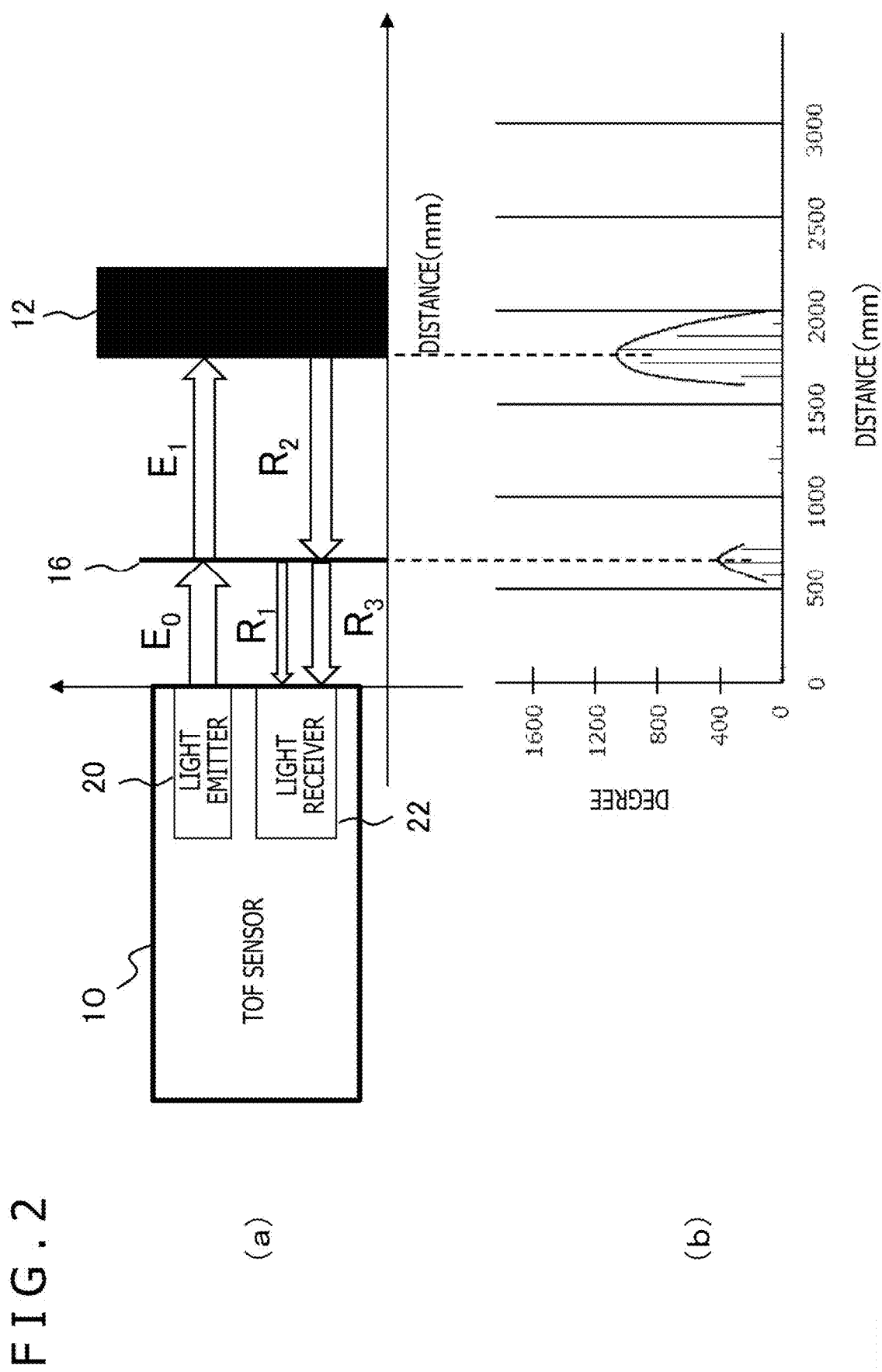
FIG. 2 is a diagram for explaining the principle of measuring a distance to an object having transmissivity in the first embodiment.

The present embodiment relates to a technology for acquiring a distance to an object by dTOF. Accordingly, a position information acquisition device that implements the present embodiment includes a TOF sensor and a device that acquires a distance to an object by using output data therefrom. Alternatively, merely the latter may be defined as a position information acquisition device, or a position information acquisition device including both in an integrated manner may be defined as a TOF sensor. In addition, reflected light is observed by a two-dimensional array of light receiving elements, thereby associating a position and a distance in an observation plane with each other and, consequently, making it possible to obtain the position of the object in a three-dimensional real space on a pixel-by-pixel basis. Thus, a ranging process described below can also be understood as acquisition of the position of the object in a three-dimensional space.

FIG. 1 illustrates by way of example environments where the TOF sensor of the present embodiment acquires a distance to a target. As illustrated in (a), a TOF sensor 10 applies light E with a predetermined wavelength to perform irradiation and detects reflected light R from an object 12, thereby deriving a distance to a position 14 on the object 12. In detail, the TOF sensor 10 includes, for example, a light emitter that applies near-infrared light with a pulse width of 100 picoseconds to several nanoseconds to perform irradiation and a light receiver including a light receiving element that detects the reflected light. Since the light emitter applies pulsed light to perform irradiation, the reflected light is also approximately in the form of pulse.

Thus, a light receiver typically detects a timing at which photons of a predetermined value or more are observed per unit of time, as an arrival time point of the reflected light. An avalanche diode is used as the light receiving element, which makes it possible to amplify the value of a charge to be outputted with respect to the number of photons, to increase detection sensitivity.

Assuming that t denotes time from application of light for irradiation to detection of the reflected light and c denotes a light speed, a distance D from the TOF sensor 10 to the position 14 on a surface of the object 12 is obtained in principle as follows.

$$D=c*t/2 \tag{1}$$

Light receiving elements are two-dimensionally arranged and individually acquire the arrival time point of the reflected light, which makes it possible to obtain two-dimensional information regarding the distance to the surface of the object 12 and, consequently, obtain three-dimensional position coordinates of the object 12. This technique has been widely known as dTOF.

Meanwhile, the TOF sensor 10 of the present embodiment also detects presence of an object 16, which is in front of the object 12 and lets irradiation light through, and a distance thereto as illustrated in (b). Even in this case, light corresponding to a certain proportion of the irradiation light E passes through the object 16 to reach the object 12. The distance to the position 14 on the surface can thus be obtained by observation of the reflected light R as in (a). Meanwhile, even when the object is highly transmissive, a part of photons of the irradiation light is reflected by the object 16. The TOF sensor 10 also observes the reflected light R' and determines an arrival time point thereof, thereby deriving a distance to a position 18 on the object 16.

FIG. 2 is a diagram for explaining the principle of measuring a distance to an object having transmissivity. The upper tier, or (a), where the abscissa axis represents a distance from the TOF sensor 10, illustrates a position relation between the object 16 having transmissivity and the object 12 having no transmissivity. The pulsed light emitted from the light emitter 20 at an intensity $E_0$ is divided into light that is reflected by the object 16 to reach the light receiver 22 at an intensity $R_1$ and light that passes through the object 16 to reach the object 12 at an intensity $E_1$. The latter of them is reflected by the object 12 at an intensity $R_2$ and partly passes through the object 16 to reach the light receiver 22 at an intensity $R_3$.

(b) illustrates a degree of photons actually observed by the light receiver 22 in the environment illustrated in (a), with the abscissa axis representing a distance based on a time point of the observation. It should be noted that, since a relation between the number of entering photons and the value of a charge to be outputted varies with the type of the light receiving elements, here, an index indicating the number of photons is referred to as the "degree." In other words, the degree is a parameter that increases with an increase in the number of photons and is expressed as, for example, the value of the charge. In a change in a degree of photons, clear local maximum points appear at the positions on the surfaces of the object 16 and the object 12 as illustrated. Thus, the observation of the reflected light is continued for a predetermined duration of time after the application of the pulsed light for irradiation to acquire a change in a degree of photons as illustrated, which makes it possible to determine respective distances to two objects overlapping when seen from the point of view of the TOF sensor 10.

It should be noted that the object 16 having transmissivity is subject to no limitation in number and transmittance as long as it lets the irradiation light and the reflected light through. Assuming that the number of surfaces having transmissivity is N and an object having no transmissivity is behind the surfaces having transmissivity, the number of observed local maximum points of a degree is N+1. In addition, a relative relation in local maximum value varies with transmittance. Hereinbelow, an object having transmittance that is not zero is referred to as a transmissive object and an object having transmittance of zero as a non-transmissive object.

It should be noted that a target for distance acquisition in the present embodiment is not limited to a combination of a transmissive object and a non-transmissive object. For example, in FIG. 2, even when no non-transmissive object 12 is present, the local maximum point of the degree of photons corresponding to the transmissive object 16 is likewise observed. Alternatively, even when a transmissive object is present in place of the non-transmissive object 12, the local maximum point is observed at the same position. However, in this case, the magnitude of the local maximum value changes. In any case, by virtue of acquiring a time point at which a local maximum point of a degree of photons is observed, a distance to an object can be acquired irrespective of transmittance.

Figure 3:
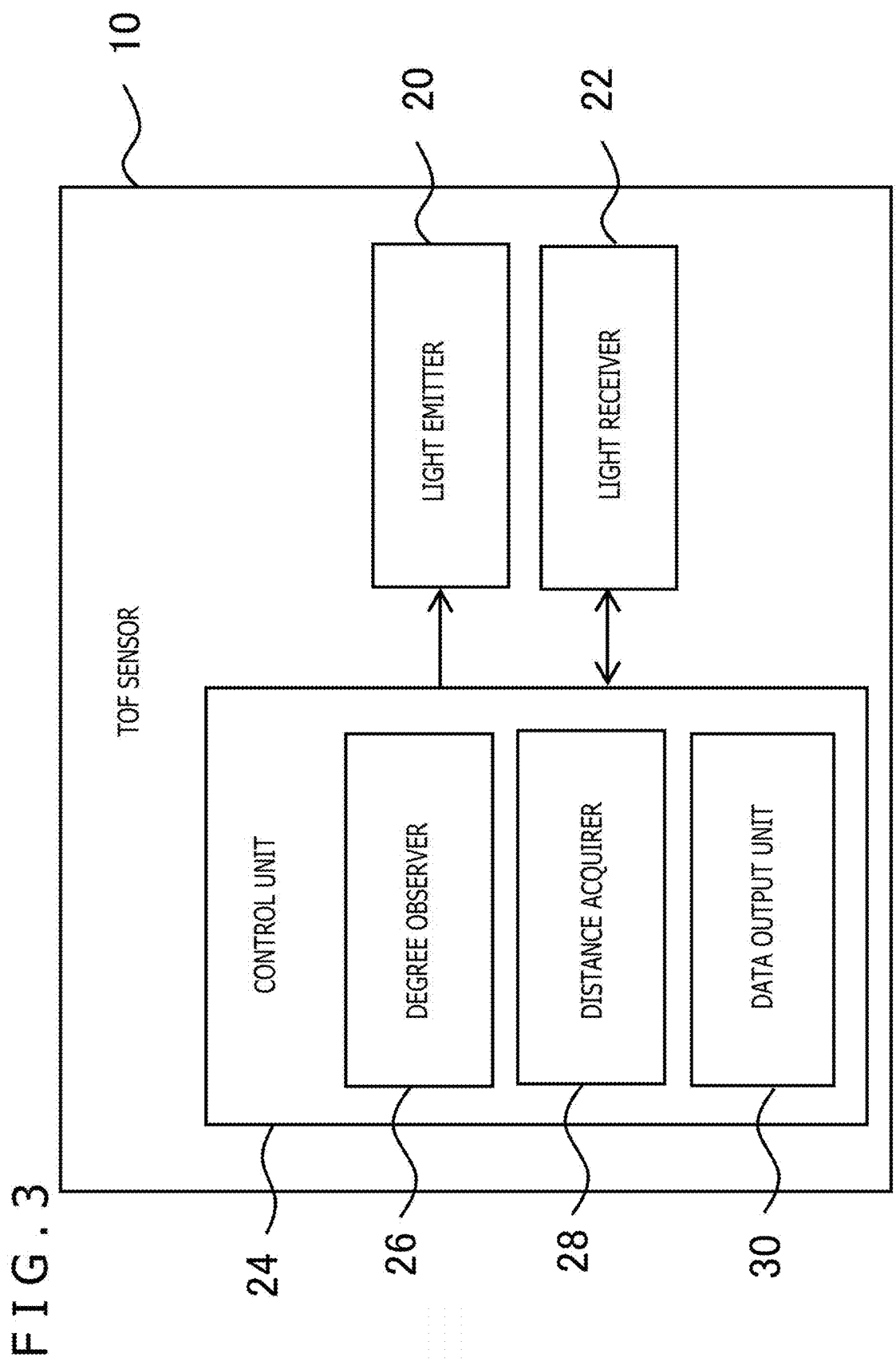
FIG. 3 is a diagram illustrating a configuration of a functional block of the TOF sensor of the first embodiment.

FIG. 3 illustrates a configuration of a functional block of the TOF sensor 10 of the present embodiment. The TOF sensor 10 includes a control unit 24 in addition to the above-described light emitter 20 and light receiver 22. The control unit 24 is implemented by, in terms of hardware, a CPU (Central Processing Unit), a microprocessor, and various circuits, and is implemented by, in terms of software, a program that is stored in a memory and that causes the CPU to operate. The control unit 24, which controls operations of the light emitter 20 and the light receiver 22, includes a degree observer 26 that observes a degree of photons of the reflected light, a distance acquirer 28 that acquires a distance to an object on the basis of the degree, and a data output unit 30 that outputs data indicating the distance.

It should be noted that another device connected to the TOF sensor 10 may be equipped with at least some of the functions of the degree observer 26, the distance acquirer 28, and the data output unit 30. In addition, the functions illustrated can collectively be referred to as a position information acquisition device irrespective of the number of enclosures. The degree observer 26 of the control unit 24 acquires, on a pixel-by-pixel basis, a temporal change in charge photoelectrically converted and outputted by the light receiver 22. The magnitude of the number of photons entering each light receiving element, or each pixel, corresponds to the magnitude of the value of the charge. In addition, the temporal change in charge can also have a plurality of local maximum points depending on presence of a transmissive object.

The distance acquirer 28 detects a time point at which a local maximum point appears in a temporal change in a degree of photons, thereby acquiring, on a pixel-by-pixel basis, a distance to an object on which reflection occurs. Here, the distance acquirer 28 may acquire a change in a degree relative to a distance in place of a temporal change in a degree. In other words, an observation time point is converted to a distance to an object by Expression 1, thereby obtaining a change in a degree as illustrated in (b) in FIG. 2.

In either case, in detecting a local maximum point, the distance acquirer 28 excludes a false local maximum point in accordance with a predetermined filtering rule. For example, with reference to the maximum value within local maximum points, the distance acquirer 28 determines a local maximum point less than a predetermined proportion of the maximum value as a false local maximum point and excludes the false local maximum point from a target for distance acquisition. Alternatively, the distance acquirer 28 may exclude all the local maximum points less than a threshold set as a constant. Further, to detect pulsed entering light, the distance acquirer 28 may extract only a local maximum point equal to or more than a threshold in terms of a change rate of an increase or a decrease in the degree of photons.

It should be noted that, in the present embodiment, it is only necessary to continue the observation of the reflected light for a predetermined duration of time from irradiation by the light emitter 20 and acquire a time point at which the observed amount of photons temporarily increases (a local maximum point appears) irrespective of the number of times; therefore, if and to the extent that the above is possible, there is no limitation on the form of data that serves as a basis. In addition, as long as a local maximum point of a degree of photons relative to time or a distance is obtainable, it is not essential to provide a histogram.

The data output unit 30 outputs, in a predetermined form, data that is acquired on a pixel-by-pixel basis by the distance acquirer 28 and that indicates a distance to an object. For example, the data output unit 30 outputs data in the form of a depth image where a distance value is stored as a pixel value of an image plane. For a pixel where a plurality of distances are acquired, the pixel value includes a plurality of values. However, this does not mean that the form of output data is not intended to be limited to the above. In addition, a destination to output data may be an external device such as an information processing device that performs information processing by using obtained position information or a storage inside or outside the TOF sensor 10.

Figure 4:
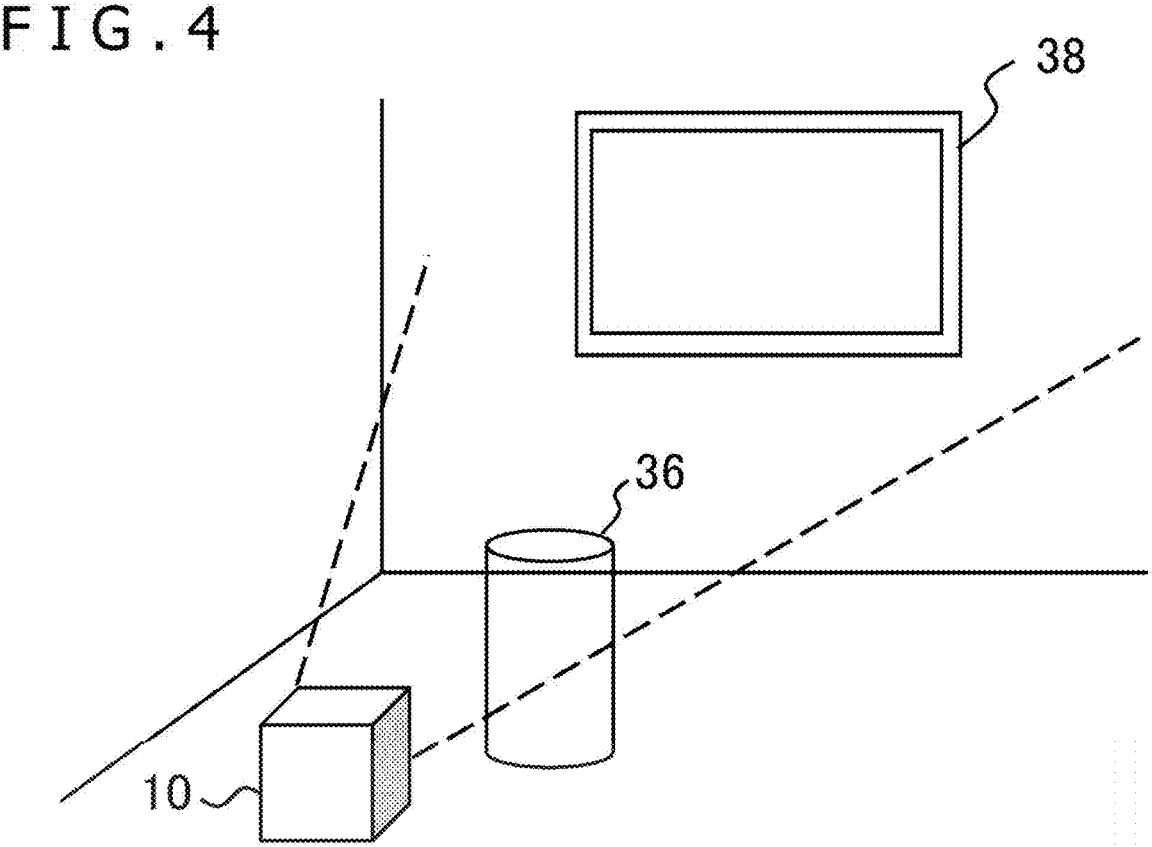
FIG. 4 is a diagram for explaining an example of output data from the TOF sensor of the first embodiment.
Figure 5:
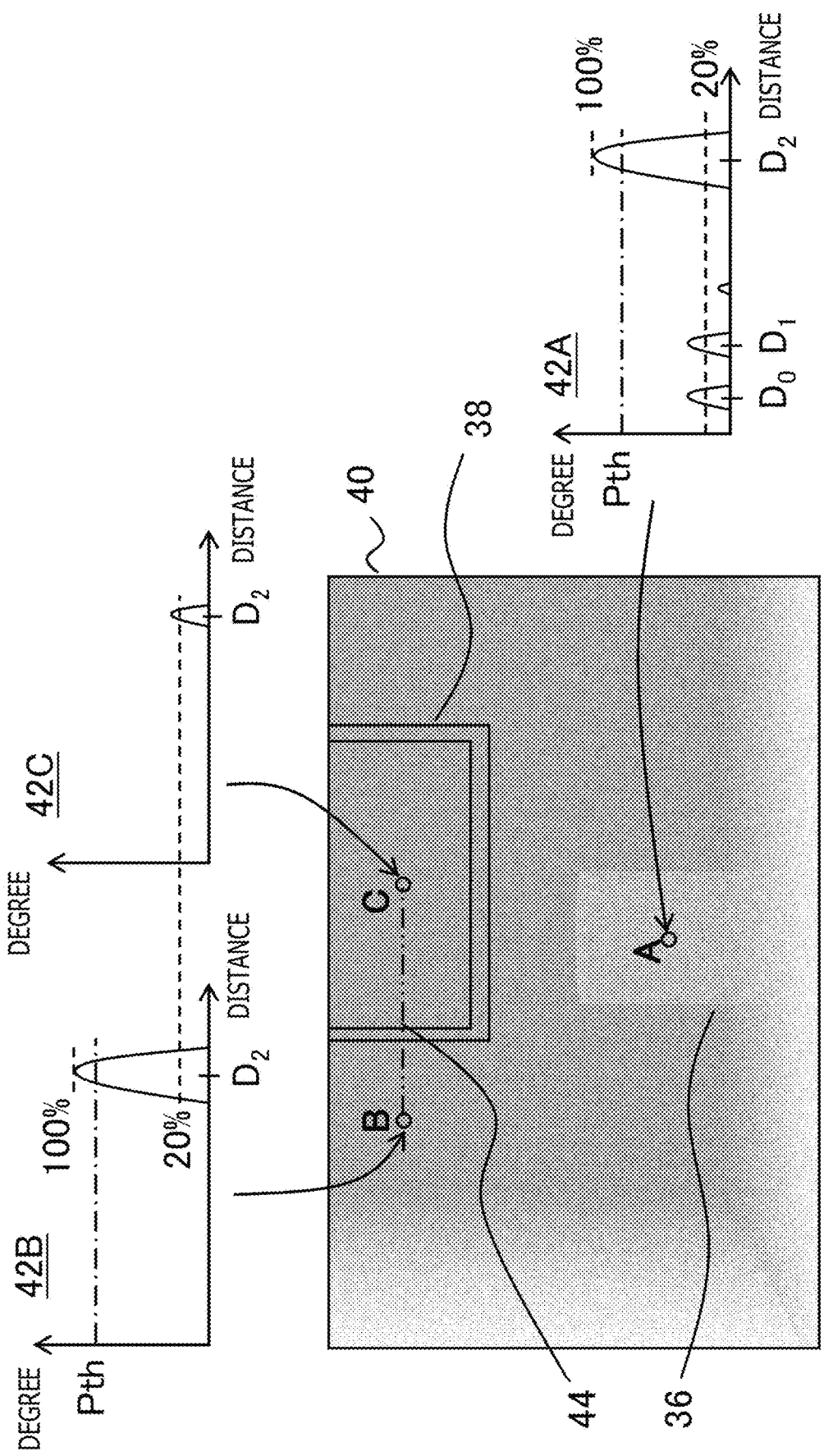
FIG. 5 is a diagram for explaining the example of the output data from the TOF sensor of the first embodiment.

FIGS. 4 and 5 are diagrams for explaining an example of output data from the TOF sensor 10. In this example, the TOF sensor 10 acquires a distance to an object with a wall with a glass window 38 being within a field of vision as illustrated in FIG. 4. A transmissive object 36 such as a glass bottle is placed in front of the wall. At this time, the TOF sensor 10 outputs, for example, data in the form of a depth image 40 as illustrated in FIG. 5. In this example, the depth image 40 is expressed in a gray scale where the smaller a distance is, the higher a luminance value is.

As described so far, in the present embodiment, a local maximum point of a degree of photons of the reflected light is detected, which makes it possible to detect a plurality of objects overlapping as seen from the TOF sensor 10. FIG. 5 also illustrates changes in degrees of photons observed at pixels A, B, and C. For example, at the pixel A, which represents a surface of the transmissive object 36, local maximum points appear at distances $D_0$, $D_1$, and $D_2$ as illustrated in a degree graph 42A and correspond to the positions of a front surface and a rear surface of the transmissive object 36 and a wall surface therebehind, respectively. An increase in transmittance of the transmissive object 36 reduces the local maximum value of the degree on the surface thereof.

As described above, with reference to the largest local maximum value, the distance acquirer 28 of the TOF sensor 10 first extracts only a local maximum point having a local maximum value reaching a predetermined proportion thereof, thereby reducing the possibility of erroneous detection. In the illustrated example, a threshold is set at a degree of 20% with reference to the local maximum value at the distance $D_2$, so that two local maximum points at the distances $D_0$ and $D_1$ with local maximum values equal to or more than the threshold are detectable. It should be noted that the distance acquirer 28 may determine a local maximum point with a local maximum value equal to or more than a predetermined value as one corresponding to a non-transmissive object in a predetermined situation where, for example, the transmittance of the transmissive object 36 is already found.

In the illustrated example, the distance acquirer 28 recognizes that a non-transmissive object is at the distance D2 where a local maximum value of the degree is equal to or more than a threshold Pth. In this case, the local maximum point with the local maximum value equal to or more than the threshold Pth can be defined as a reference for detection of another local maximum point and a local maximum point detected at a farther position over the distance D2 can be removed as noise. As a result, for the pixel A within the depth image 40, the data output unit 30 of the TOF sensor 10 stores three pixel values at $D_0$, $D_1$, and $D_2$.

The fact that a plurality of effective distances are obtained as above means that an object other than an object at the largest distance has transmissivity. Accordingly, the data output unit 30 may output a distance and physical properties in association with each other; for example, transmissive objects are at the distances $D_0$ and $D_1$ and a non-transmissive object is at the distance $D_2$. In addition, an increase in transmittance of a transmissive object reduces the degree of photons resulting from reflection thereby. Accordingly, the data output unit 30 may further acquire a local maximum value of the degree of photons from the distance acquirer 28 and output transmittance estimated according to the magnitude of the local maximum value of the degree of photons in association with a distance. A relation between a local maximum value of the degree of photons and transmittance is obtained in advance by experiment or the like.

In contrast, at the pixel B, which represents the wall surface, a local maximum point appears only at the distance $D_2$ as illustrated in a degree graph 42B, so that a distance to the wall is found. Further, also at the pixel C, which represents the glass window 38, a local maximum point appears only at the distance $D_2$ as illustrated in a degree graph 42C. Such a single local maximum point appears unless an object is present on the outside of the glass window 38. In this case, in the degree graph 42C, a local maximum value is small as compared with in the degree graph 42B at the pixel B of the wall surface, and no local maximum point that serves as a reference is present unlike in the degree graph 42A at the pixel A. Accordingly, the distance acquirer 28 may obtain a local maximum point that serves as a reference in a spatial direction.

In other words, the distance acquirer 28 searches a plane of the depth image 40 for another pixel having a local maximum point substantially at the same distance (or time point) and a local maximum value thereof is equal to or more than a predetermined value. For example, on a line BC, changes as in the degree graph 42B and the degree graph 42C occur at a boundary 44 between a window frame and the window. Accordingly, the distance acquirer 28 performs a search, for example, in a left direction from the pixel C, thereby detecting a pixel where an effective local maximum point has been obtained as in the degree graph 42B. The illustrated example illustrates detection of a pixel where a local maximum value is equal to or more than the threshold Pth.

Then, with reference to the local maximum point at the detected pixel, the distance acquirer 28 excludes a local maximum point at the original pixel C from a target for distance acquisition if the local maximum point at the original pixel C is smaller than a predetermined proportion of the reference value. In this case, it is concluded that there is nothing at that distance. In the illustrated example, the threshold is set at the degree corresponding to 20% of the reference local maximum value, and the local maximum point at the pixel C is equal to or more than the threshold, so that it is determined that an object is present at that distance. The distance acquirer 28 can thus add, as the pixel value of the pixel C, the distance $D_2$ to the output data. The distance acquirer 28 may also cause the output data to indicate that, on the basis of the smallness of the local maximum point, the object present at the distance $D_2$ is a transmissive object.

It should be noted that, in performing a search, in the spatial direction, for a reference local maximum point, a searching direction and a specific processing procedure are not particularly limited to any direction and procedure. For example, in a case where the distance acquirer 28 acquires a distance in a raster order, at the time at which a change from the degree graph 42B to the degree graph 42C occurs, that is, the time at which a local maximum value at the same distance (or time point) decreases by a predetermined value or more, a local maximum value before the decrease may be set as a reference to determine whether a local maximum point obtained at a subsequent pixel is true or false.

Alternatively, in a predetermined situation where, for example, the transmittance of an object in the field of vision of the TOF sensor 10 is substantially found, a threshold provided for a local maximum value of the degree according to an object with a high transmittance may be set as a constant. In this case, the distance acquirer 28 extracts all the local maximum points with local maximum values equal to or more than the threshold. This allows for recognizing that the window is at the distance $D_2$, without the necessity for searching for a reference even when, for example, the TOF sensor 10 gets close to the glass window 38 with an observation result as in the degree graph 42C obtained all over the image. For the pixels B and C within the depth image 40, the data output unit 30 of the TOF sensor 10 stores only the distance $D_2$ as a pixel value.

Figure 6:
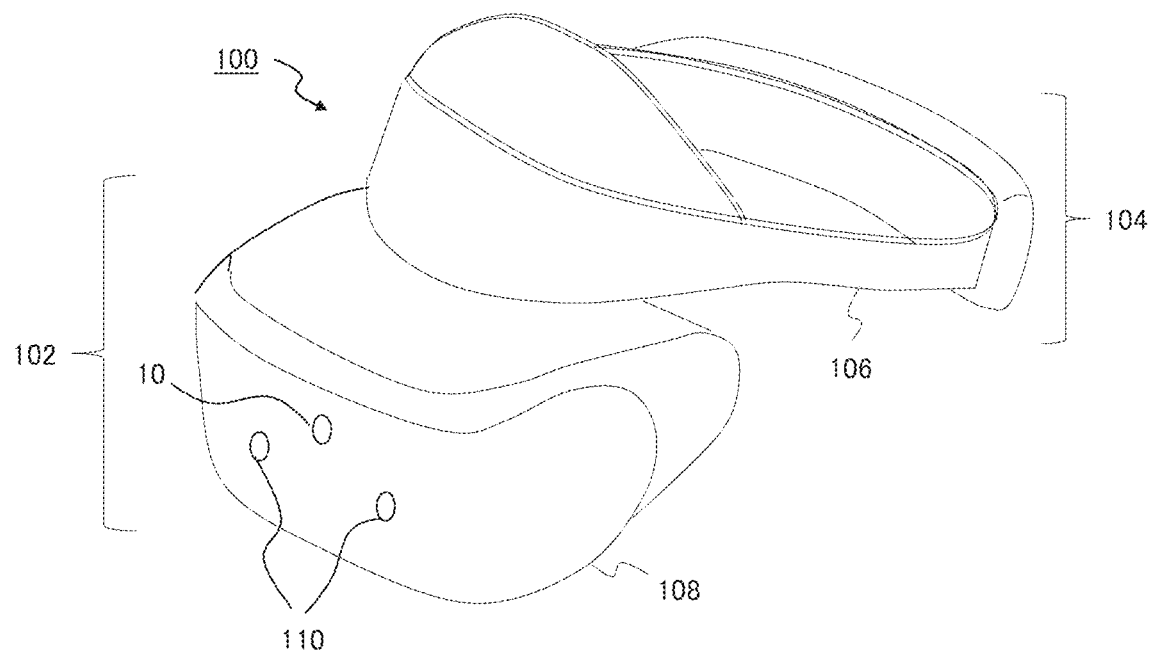
FIG. 6 is a diagram illustrating an example of an appearance form of a head-mounted display according to the first embodiment.

The TOF sensor 10 described so far is supposed to be usable for a variety of purposes. Hereinbelow, an aspect where the TOF sensor 10 is installed in a head-mounted display will be described by way of example. FIG. 6 illustrates an example of an appearance form of a head-mounted display according to the present embodiment. In this example, a head-mounted display 100 includes an output mechanism unit 102 and a wearing mechanism unit 104. The wearing mechanism unit 104 includes a wearing band 106 that fully surrounds a head when placed on a user, enabling the device to be fixed. The wearing band 106 includes a material or has a structure allowing the wearing band 106 to be adjusted in length according to the head circumference of each user. For example, the wearing band 106 may be in the form of an elastic body such as rubber, or a buckle, a gear, or the like may be used as the wearing band 106.

The output mechanism unit 102 includes an enclosure 108 that is shaped to cover right and left eyes of a user who is wearing the head-mounted display 100 and that has an interior provided with a display panel that squarely faces the eyes while the user is wearing the head-mounted display 100. The display panel is implemented by a liquid crystal panel, an organic EL (Electroluminescent) panel, or the like. The interior of the enclosure 108 further includes a pair of lenses located between the display panel and the eyes of the user to extend the viewing angle of the user while the user is wearing the head-mounted display 100. In addition, the head-mounted display 100 may further include a speaker and/or an earphone at a position corresponding to an ear of the user while the user is wearing the head-mounted display 100.

The head-mounted display 100 includes, in a front surface of the output mechanism unit 102, a stereo camera 110 and the TOF sensor 10. The stereo camera 110 includes two cameras located right and left at a known interval therebetween, each of which includes an imaging element such as a CCD (Charge Coupled Device) or a CMOS (Complementary Metal Oxide Semiconductor). The stereo camera 110 captures, at a predetermined frame rate, an image of the real space in a field of vision corresponding to the orientation of the face of the user who is wearing the head-mounted display 100.

With a video captured by the stereo camera 110 being directly displayed in the head-mounted display 100, the user sees the video as if directly seeing the real space in front of him/her. In addition, the position and/or the posture of the head of the user can be acquired from the image captured by the stereo camera 110 by a typical technology such as v-SLAM (Visual Simultaneous Localization And Mapping). The TOF sensor 10 acquires a distance to an object in the field of vision corresponding to the orientation of the face of the user who is wearing the head-mounted display 100.

As long as the TOF sensor 10 obtains information regarding relative positions and postures of the head-mounted display 100 and the real object, analysis of the image captured by the stereo camera 110 can be omitted. It should be noted that the position and/or the posture of the head of the user may be obtained on the basis of a value of measurement by a motion sensor installed in the head-mounted display 100 or may be enhanced in accuracy by integration with a result of distance measurement by the TOF sensor 10. However, some of the functions or installation of the stereo camera 110 and the motion sensor may be omitted according to display contents.

In a case where VR (Virtual Reality) is established by the head-mounted display 100 in a form that shields outside light, it is difficult for the user to understand the situation of the real world around him or her. Thus, it is possible that the user comes into contact with an obstacle while walking around or moves in an unintended direction, resulting in disruption of normal display or occurrence of a danger. For example, a highly transmissive object such as glass is unlikely to be recognized by a visible light camera such as the stereo camera 110. In addition to the above-described glass window and bottle, a lot of transmissive objects, such as an empty plastic bottle, a glass-topped table, and a glass wall, can be present in a typical room.

The TOF sensor 10 of the present embodiment can detect such transmissive objects, which makes it possible to issue a warning to the user with accuracy. In addition, while a video captured by the stereo camera 110 is displayed, a picture of a virtual object is displayed to be superimposed thereon such that the picture interacts with an object the position information regarding which is obtained by the TOF sensor 10, enabling even AR (Augmented Reality) or MR (Mixed Reality) to be established. Even in this case, it is possible to provide a high-quality user experience without ignoring presence of a transmissive object such as a glass table.

Figure 7:
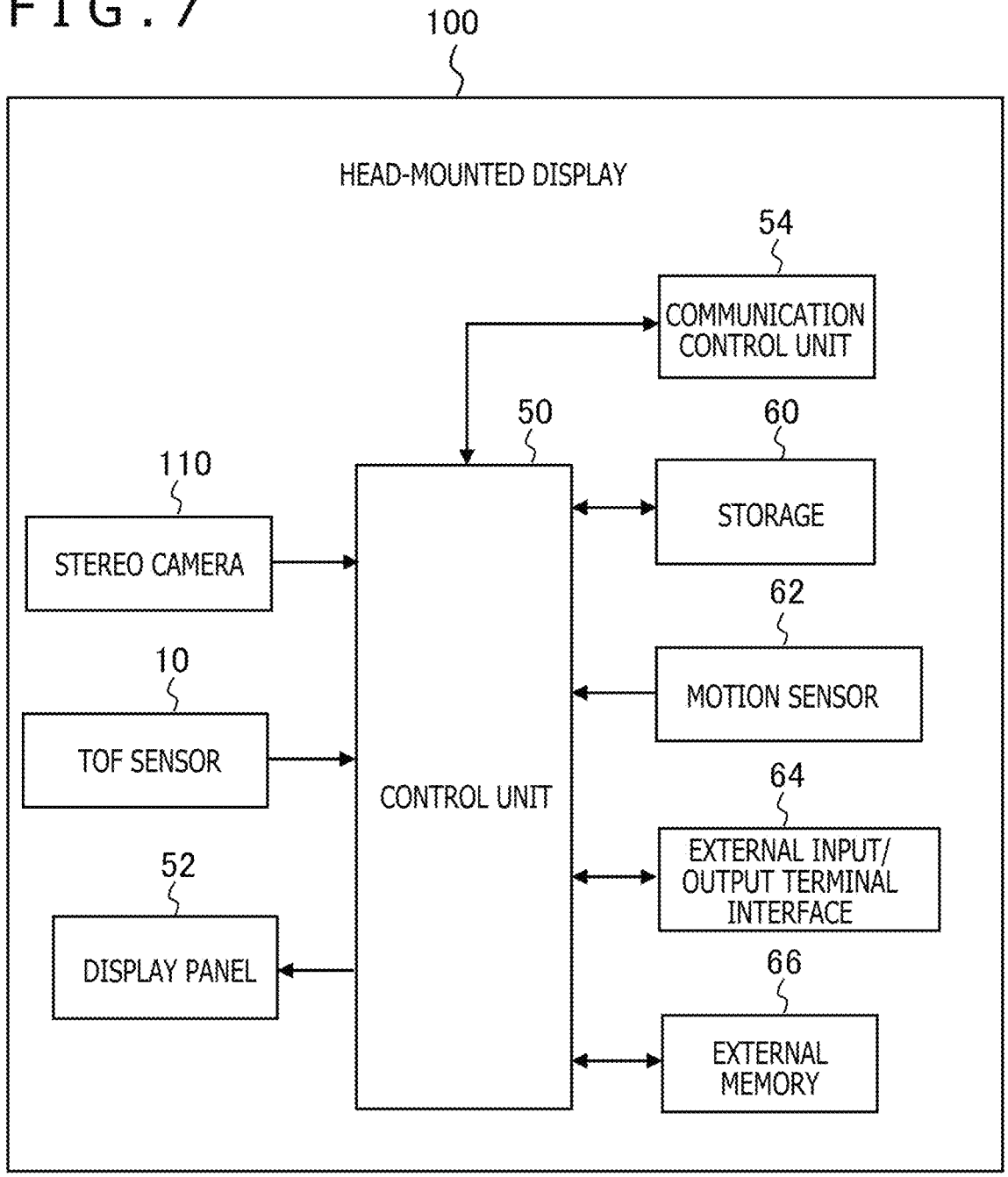
FIG. 7 is a diagram illustrating by way of example an internal configuration of the head-mounted display according to the first embodiment.

FIG. 7 illustrates by way of example an internal configuration of the head-mounted display 100. A control unit 50 is a main processor that processes and outputs signals, such as an image signal and a sensor signal, a command, and data. The stereo camera 110 supplies data regarding a captured image to the control unit 50 at a predetermined rate. The TOF sensor 10 acquires position information regarding an object at a predetermined rate by the above-described technique and supplies the position information in the form of a depth image or the like to the control unit 50. A display panel 52, which includes a light emission panel of liquid crystal, organic EL, or the like and a control mechanism therefor, receives and displays the image signal from the control unit 50.

A communication control unit 54 sends data inputted from the control unit 50, to the outside by wired or wireless communication through an unillustrated network adapter or an unillustrated antenna. The communication control unit 54 also receives data from the outside by wired or wireless communication through the network adapter or the antenna and outputs the data to the control unit 50. A storage 60 temporarily stores data, a parameter, an operation signal, and the like to be processed by the control unit 50.

A motion sensor 62 measures posture information such as the rotation angle and the tilt of the head-mounted display 100 and constantly supplies the posture information to the control unit 50. An external input/output terminal interface 64 is an interface for connecting peripheral equipment such as a USB (Universal Serial Bus) controller. An external memory 66 is an external memory such as a flash memory. The control unit 50 can supply an image and voice data to the display panel 52 and a headphone not illustrated, causing the display panel 52 and the headphone to output the image and the voice data, or supply the image and the voice data to the communication control unit 54, causing the communication control unit 54 to send the image and the voice data to the outside.

Figure 8:
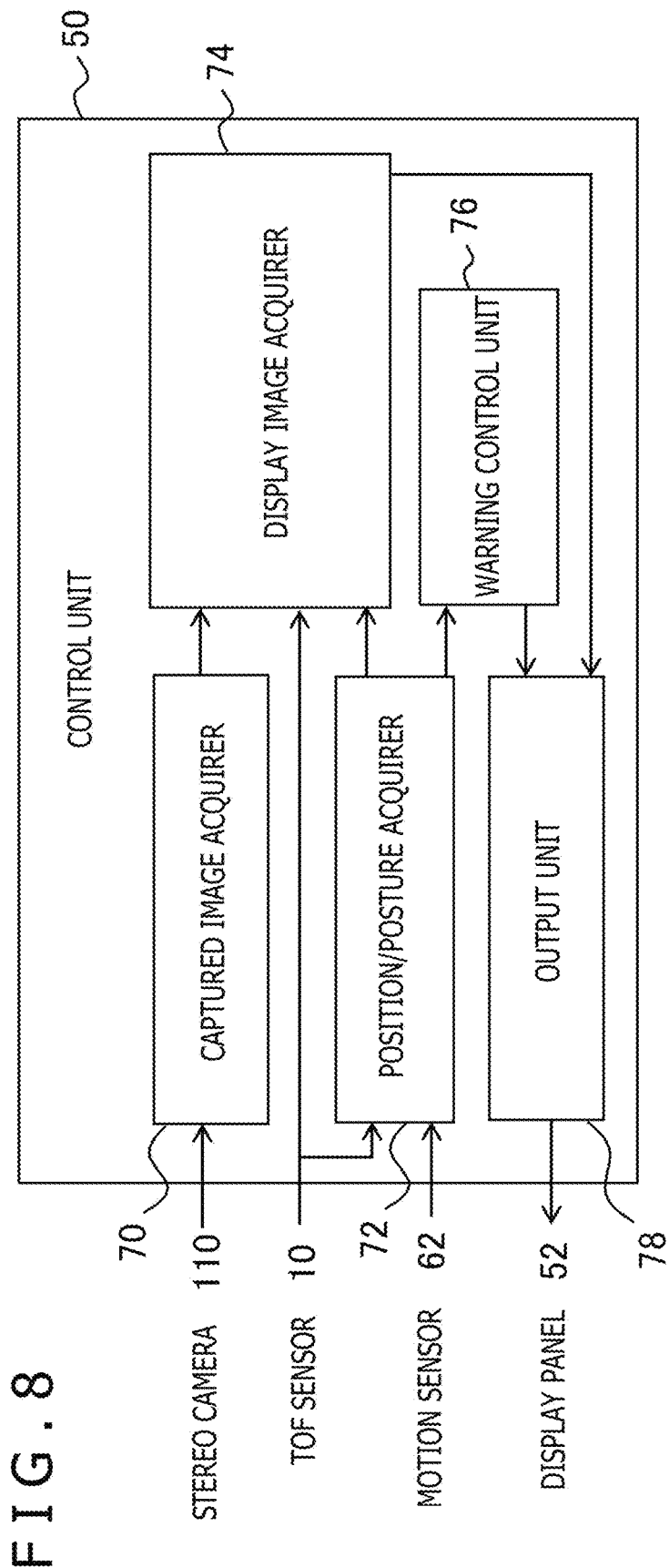
FIG. 8 is a diagram illustrating a configuration of a functional block of a control unit of the head-mounted display to which the TOF sensor of the first embodiment is applicable.

FIG. 8 illustrates a configuration of a functional block of the control unit 50 of the head-mounted display to which the TOF sensor 10 of the present embodiment is applicable. The functional block described herein can be implemented by, in terms of hardware, a configuration including a CPU, a GPU (Graphics Processing Unit), communication equipment, a memory, and the like, and is implemented by, in terms of software, a program that is loaded into the memory from a recording medium and that exhibits functions such as a data input function, a data holding function, an image processing function, and a communication function. Thus, it should be understood by those skilled in the art that these functional blocks can be implemented in various forms based on hardware only, software only, or a combination thereof and are by no means limited to any of them.

The control unit 50 includes a captured image acquirer 70, a position/posture acquirer 72, a display image acquirer 74, a warning control unit 76, and an output unit 78. The captured image acquirer 70 sequentially acquires frame data regarding a moving image of the real space captured by the stereo camera 110. The position/posture acquirer 72 acquires information regarding a distance to an object present in the real space from the TOF sensor 10 at a predetermined rate. In a case where the TOF sensor 10 outputs a depth image, a distance value is stored as a pixel value of a two-dimensional picture as illustrated in FIG. 5, so that reverse projection into a three-dimensional space makes it possible to obtain three-dimensional position coordinates of an object surface with reference to an image-capturing plane.

The position/posture acquirer 72 also acquires, at a predetermined rate, values of acceleration, angular speed, and the like measured by the motion sensor 62. By using the acquired information, the position/posture acquirer 72 acquires, at a predetermined rate, the position of an object that is present in front of the user and the posture of the head-mounted display. By using the captured image acquired by the captured image acquirer 70 and the information regarding the position and the posture of the object and the head-mounted display 100 themselves acquired by the position/posture acquirer 72, the display image acquirer 74 acquires a display image at a predetermined rate.

For example, the display image acquirer 74 generates an image where a virtual object is displayed to be superimposed on a captured image. Alternatively, the display image acquirer 74 creates a three-dimensional space representing a virtual world for an electronic game or the like and generates a display image representing the space in a field of vision corresponding to the position and the posture of the head-mounted display 100. A target to display is not limited to a virtual world but may be a panoramic video of the real world, for example. Alternatively, the display image acquirer 74 may use a captured image as a display image without change. Thus, a variety of display images may be acquired by the display image acquirer 74 and, depending on that, a variety of data are to be used.

In the case of displaying a virtual object in a superimposed manner to establish AR or MR, in particular, the use of information regarding the position and the posture of a transmissive object obtained from the TOF sensor 10 allows for preventing occurrence of an unnatural situation where, for example, the virtual object pierces the glass, to achieve an accurate display. It should be noted that the display image acquirer 74 does not necessarily generate all the display images by itself and may acquire at least some of the display images from an external information processing device or the like. In this case, the display image acquirer 74 may send data to be used for generation of a display image to the external information processing device or the like.

The warning control unit 76 determines whether or not a situation requiring issuance of a warning to the user occurs, on the basis of the position information regarding the object acquired by the position/posture acquirer 72. When a predetermined condition set as the situation requiring issuance of a warning is satisfied, the warning control unit 76 performs control to cause an image providing a warning to the user to be displayed. The warning control unit 76 causes a warning to be displayed when predicting that the user is in danger of, for example, bumping into a nearby object or stepping on an object on the floor. By virtue of the use of the position information regarding a transmissive object obtained from the TOF sensor 10 of the present embodiment, it is possible to accurately detect that an object unlikely to be recognized from a captured image, such as glass or a plastic bottle, gets closer.

In this case, a threshold for a distance between the user and a nearby object is set in advance in the warning control unit 76. The warning control unit 76 then causes a warning to be displayed when an actual distance reaches the threshold or less. The threshold may differ according to the type or the material (transmissive object or non-transmissive object) of an object, a location where the object is present, or the like. Further, in the warning control unit 76, respective types of warning contents to be issued have been set in association with those parameters.

For example, when the user becomes extremely close to the window, the warning control unit 76 causes textual information "You are getting close to the window" to be displayed. In addition, the warning control unit 76 may give the user who is wearing the head-mounted display 100 instructions to look around prior to the start of the display of content such as a game and cause, when detecting an object such as a plastic bottle in the vicinity of the user, textural information "Put the thing on the floor away" to be displayed. This allows for watching content safely afterward.

The output unit 78 causes the display image generated or acquired by the display image acquirer 74 to be displayed on the display panel 52. The output unit 78 also causes, at a timing for issuing a warning, an image of textural information indicating the contents of the warning or the like to be displayed on the display panel 52, according to a requirement from the warning control unit 76. An image providing a warning may be superimposed on an image having been displayed before that or may be switched to be displayed alone.

Figure 9:
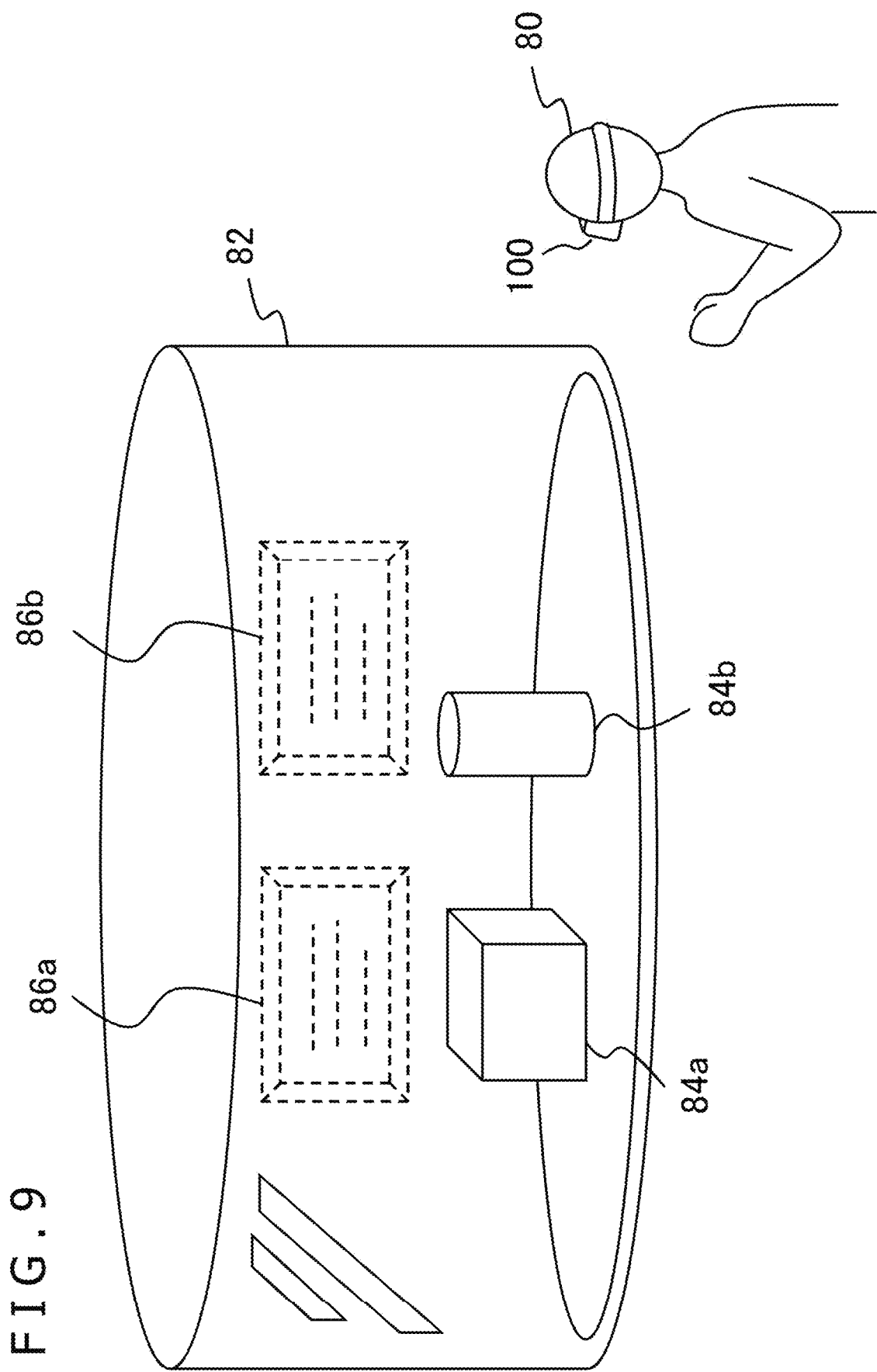
FIG. 9 is a diagram illustrating an example of an environment where the head-mounted display in which the TOF sensor of the first embodiment is mounted is usable.

FIG. 9 illustrates an example of an environment where the head-mounted display 100 in which the TOF sensor 10 is mounted is usable. In this example, a user 80 wearing the head-mounted display 100 looks at exhibits 84*a* and 84*b* placed in a showcase 82. The showcase 82, needless to say, includes a highly transmissive material such as glass or resin. The head-mounted display 100 causes an image captured by the stereo camera 110 to be displayed, enabling the user 80 to see the real world in a field of vision corresponding to his or her field of vision.

Moreover, the head-mounted display 100 causes, for example, virtual objects 86*a* and 86*b*, which provide explanations about the exhibits 84*a* and 84*b* looked at by the user 80, to be displayed above the respective exhibits. In FIG. 9, dotted lines mean that the virtual objects 86*a* and 86*b* are not real objects. At this time, the display image acquirer 74 places the virtual objects 86*a* and 86*b* at predetermined positions in a three-dimensional space corresponding to the real space and draws a picture where the three-dimensional space is projected onto screen coordinates in the head-mounted display 100.

Since the screen coordinates may freely change according to the motion of the user 80, the display image acquirer 74 acquires relative positions and postures between the exhibits 84*a* and 84*b* and a front surface of the head-mounted display 100 from the position/posture acquirer 72. This information can be generated on the basis of output data from the TOF sensor 10. The pictures of the virtual objects 86*a* and 86*b* are displayed to be superimposed on the image captured by the stereo camera 110, and the objects where the explanations are written thereby appear to the user 80 to float above the exhibits 84*a* and 84*b*. For example, even when the exhibit 84*a* is a transmissive object, the display image acquirer 74 can correctly place the virtual object 86*a* on the basis of the position of the exhibit 84*a*.

Meanwhile, in a case where the showcase 82 is large or high with respect to the exhibits 84a and 84b, presence of the showcase 82 is unlikely to be seen in the image displayed in the head-mounted display 100, so that the user 80 getting close to the exhibits 84a and 84b is in danger of bumping into the showcase 82. Accordingly, the warning control unit 76 causes, when detecting that a distance between the user 80 and the showcase 82 reaches a threshold or less, an image for warning him or her not to come any closer to be displayed. The TOF sensor 10 of the present embodiment enables parallel detection of a transmissive object such as the showcase 82 and an object on a far side thereof, which makes it possible to perform independent processes; for example, AR is established with one of them, while the other one is used as a basis for warning.

It should be noted that the position information to be obtained by the TOF sensor 10 is not necessarily used for both generation of a display image and warning. For example, the position information regarding an object from the TOF sensor 10 may be used only for warning, while an image captured by the stereo camera 110 is displayed as a display image without change. Alternatively, the position information regarding an object from the TOF sensor 10 may be used only for generation of a display image. In addition, it should be understood by those skilled in the art that the position information regarding an object from the TOF sensor 10 is usable for a variety of purposes in addition to generation of a display image and warning.

Figure 10:
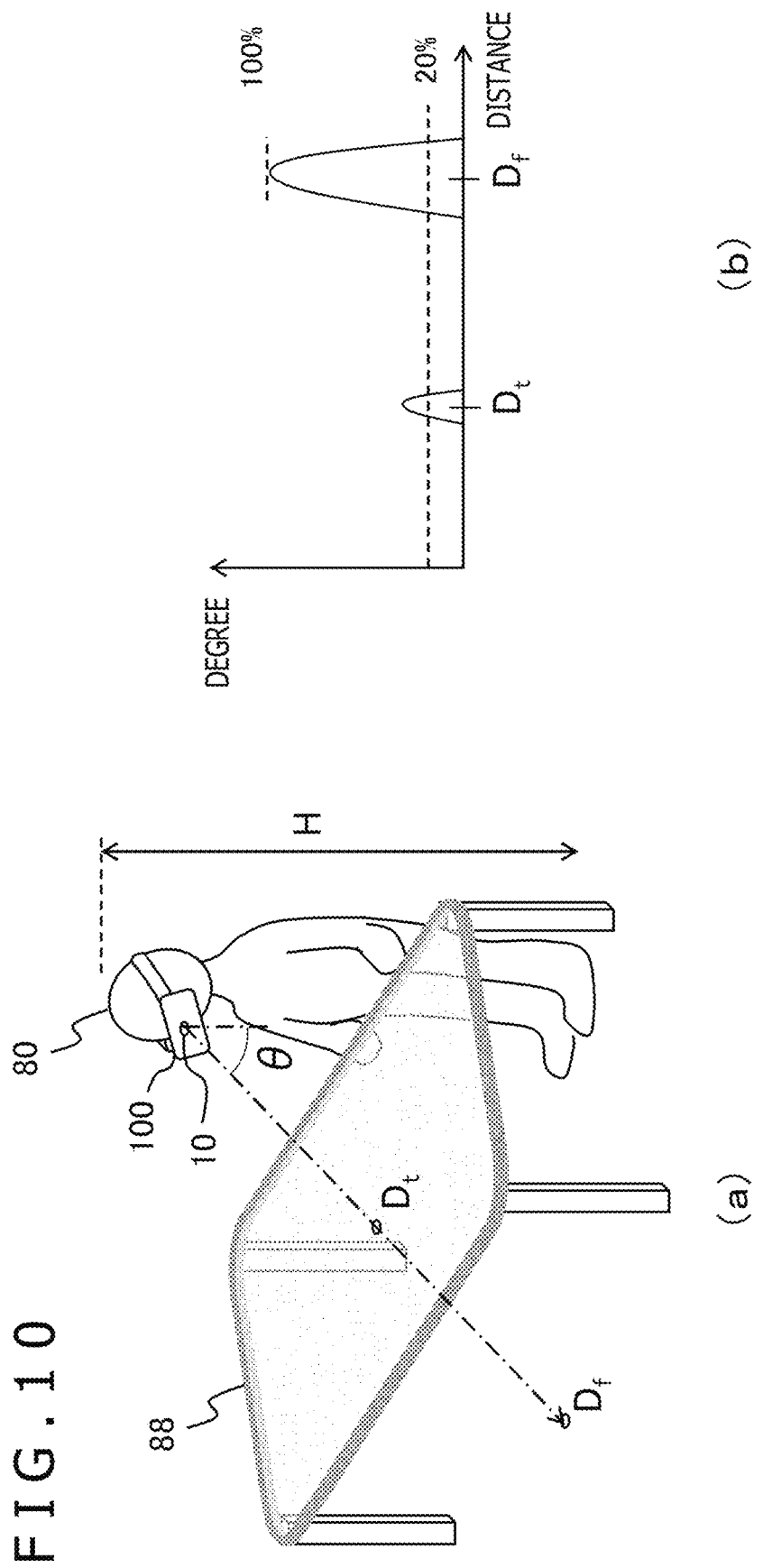
FIG. 10 is a diagram for explaining an example of a technique for detecting a nearby object in a case where the TOF sensor of the first embodiment is mounted in the head-mounted display.

FIG. 10 is a diagram for explaining an example of a technique for detecting a nearby object in a case where the TOF sensor 10 is mounted in the head-mounted display 100. As described in relation to FIG. 5, with reference to a local maximum point of a degree of photons corresponding to a non-transmissive object, a transmissive object present in front of the non-transmissive object can be detected with a higher accuracy. In contrast, in a case where the head-mounted display 100 is worn to enjoy content indoors, a distance to a floor or a wall, which is a non-transmissive object, is roughly predictable. For example, in a situation as illustrated in (a) in FIG. 10, a distance to a glass table 88, which is a transmissive object, is to be acquired.

Here, light applied from the TOF sensor 10 for irradiation travels as represented by a chain arrow, and passes through a top panel of the table 88 located at a distance $D_t$, to reach a floor located at a distance $D_f$. Assuming that H denotes the height of the user 80 and θ denotes, as the posture of the head-mounted display 100 in this state, a front-surface-direction angle relative to a vertically downward side, the distance $D_f$ to the floor can be calculated as follows.

$$D_f = H/\cos θ \quad \text{(Expression 2)}$$

By virtue of such estimation of the distance to the floor, with reference to a local maximum point of photons appearing thereat, the position of the top panel of the table 88 can be acquired with accuracy.

In this case, the height T of the user 80 is registered in advance in the position/posture acquirer 72 of the control unit 50 of the head-mounted display 100. In addition, the angle θ is constantly acquired from the motion sensor 62 of the head-mounted display 100. Then, the position/posture acquirer 72 first roughly calculates the distance $D_f$ to the floor by using Expression 2. The TOF sensor 10 is informed of the roughly calculated value to cause the distance acquirer 28 of the TOF sensor 10 to identify a local maximum point that seems to be at the distance $D_f$ in a graph of the degree of photons as illustrated in (b) as being derived from reflected light from the floor.

The distance acquirer 28 then detects a local maximum point at a distance smaller than the distance $D_f$, thereby acquiring the distance $D_t$ of the top plate of the table 88. Even in this case, erroneous detection can be prevented by extracting a local maximum point that reaches a predetermined proportion (in FIG. 10, 20%) of the local maximum value of the local maximum point corresponding to the floor. It should be noted that, in a case where a range for the user 80 to move indoors is limited to a certain extent, a wall can be defined as a reference as well as the floor as long as an approximate distance to the wall has been registered.

It should be noted that such a process to obtain a distance to a transmissive object on the basis of registered information and the posture of the head-mounted display 100 may be performed by the position/posture acquirer 72 of the control unit 50 of the head-mounted display 100 in place of the TOF sensor 10. In this case, it is only necessary for the TOF sensor 10 to supply a degree graph as that illustrated in (b) to the control unit 50. In addition, a similar process is possible even in a mobile terminal, a smartphone, a game device, and the like in addition to the head-mounted display 100.

According to the present embodiment described hereinabove, a dTOF sensor, which applies pulsed light with a predetermined wavelength for irradiation and measures a distance to an object on the basis of time elapsed until observation of the reflected light, acquires a change in a degree of photons during a predetermined duration of time after the application of the light. The distance to the object is then calculated on the basis of a time point at which a degree that exceeds a predetermined reference and that can be considered as the reflected light is observed. For example, a time point at which a local maximum point appears in the degree of photons is detected to calculate the corresponding distance. By virtue of observation of a temporal change in a degree of photons, even a degree of photons with a small absolute value can be detected as the reflected light.

As a result, it is possible to accurately detect a highly transmissive object unlikely to be detected in an image captured by a visible light camera or seen by a user. In addition, reflection of light that has passed through such a highly transmissive object can simultaneously be detected, which makes it possible to acquire in parallel a distance to an object on a far side. A technology using ultrasonic waves as irradiation light is suggested as means for acquiring a distance to a highly transmissive object by dTOF. However, presence of an object on a near side interferes with the straightness of ultrasonic waves irrespective of the transmittance of the object, so that it is difficult to simultaneously detect an object on a far side in an irradiation direction. The TOF sensor of the present embodiment enables both the detection of a transmissive object and the simultaneous detection of a plurality of objects. As a result, position information regarding a variety of objects can easily be acquired in a diversity of environments, which makes it possible to significantly increase the range of uses of the TOF sensor.

Second Embodiment

Figure 11:
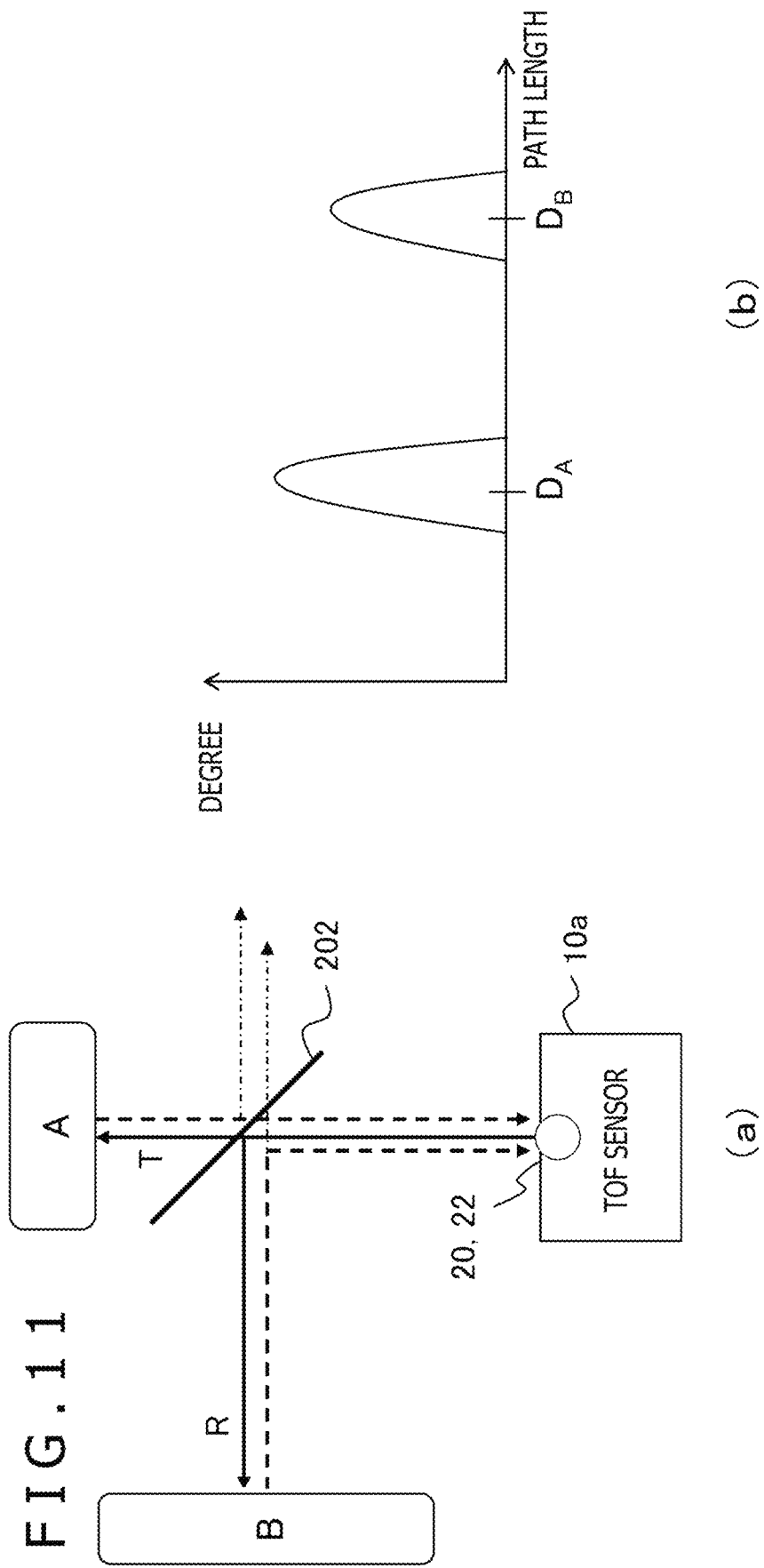
FIG. 11 is a diagram for explaining the basic principle of a position acquisition technique of a second embodiment.

In the first embodiment, the description is made on the technique for acquiring, by using transmission and reflection of light through and from a transmissive object, distances to a plurality of objects that are present in the same direction. In the present embodiment, irradiation light is distributed in a plurality of directions to acquire the positions of objects that are present in the plurality of directions. FIG. 11 is a diagram for explaining the basic principle of a position acquisition technique of the present embodiment. As illustrated in a top view in (a), a position information acquisition system of the present embodiment includes a TOF sensor 10a and a one-way mirror (a semi-transmissive mirror) 202 located on a path of irradiation light from the TOF sensor 10a. The TOF sensor 10a may have a configuration similar to that illustrated in FIG. 3.

The one-way mirror 202 may be a typical mirror that lets a predetermined proportion of entering light through and reflects the rest. With a surface of the one-way mirror 202 being placed with a tilt of 45 degrees relative to a surface, of the TOF sensor 10a, provided with the light emitter 20 and the light receiver 22 as illustrated, the path of reflected light R makes an angle of 90 degrees relative to transmission light T traveling straight, as represented by a solid arrow. As a result, the transmission light T reaches an object A located in front of the TOF sensor 10, and the reflected light R reaches an object B located diagonally in front (in FIG. 11, left diagonally in front) of the TOF sensor 10a.

In FIG. 11, a broken arrow represents the path of the reflected light from each of the objects. In other words, the light reflected by the object A passes through the one-way mirror 202 again, entering the TOF sensor 10a. The light reflected by the object B is bent by the one-way mirror 202 again, entering the TOF sensor 10a. It should be noted that a part of the reflected light from the object A is reflected by the one-way mirror 202 and a part of the reflected light from the object B passes through the one-way mirror 202. These types of light, which do not contribute to observation by the TOF sensor 10a, are also represented by chain lines in FIG. 11.

In a case where a change in a degree of photons is obtained in such a state, a local maximum point corresponding to the length of a path where the light comes and goes appears as illustrated in, for example, (b). In the illustrated example, local maximum points are obtained at a path length $D_A$ to the object A and a path length $D_B$ to the object B. As a result, assuming that a distance and a posture (tilt) between the TOF sensor 10a and the one-way mirror 202 are known, the positions of the objects A and B relative to the TOF sensor 10a are found.

For example, assuming that, in the paths of the light, a distance from the TOF sensor 10a to the one-way mirror 202 is 1 m, the path length $D_A$ based on an observation result is 1.3 m, and the path length $D_B$ is 1.5 m, a distance from the one-way mirror 202 to the object A is 0.3 m, and a distance to the object B is 0.5 m. In other words, it is found that the objects are at the respective distances on the paths of the transmission light and the reflected light from the one-way mirror 202. By virtue of such a combination of the one-way mirror 202 with the TOF sensor 10a, it is possible to simultaneously acquire the positions of objects that are present in a variety of directions in addition to an object located in front of the TOF sensor 10a.

Figure 12:
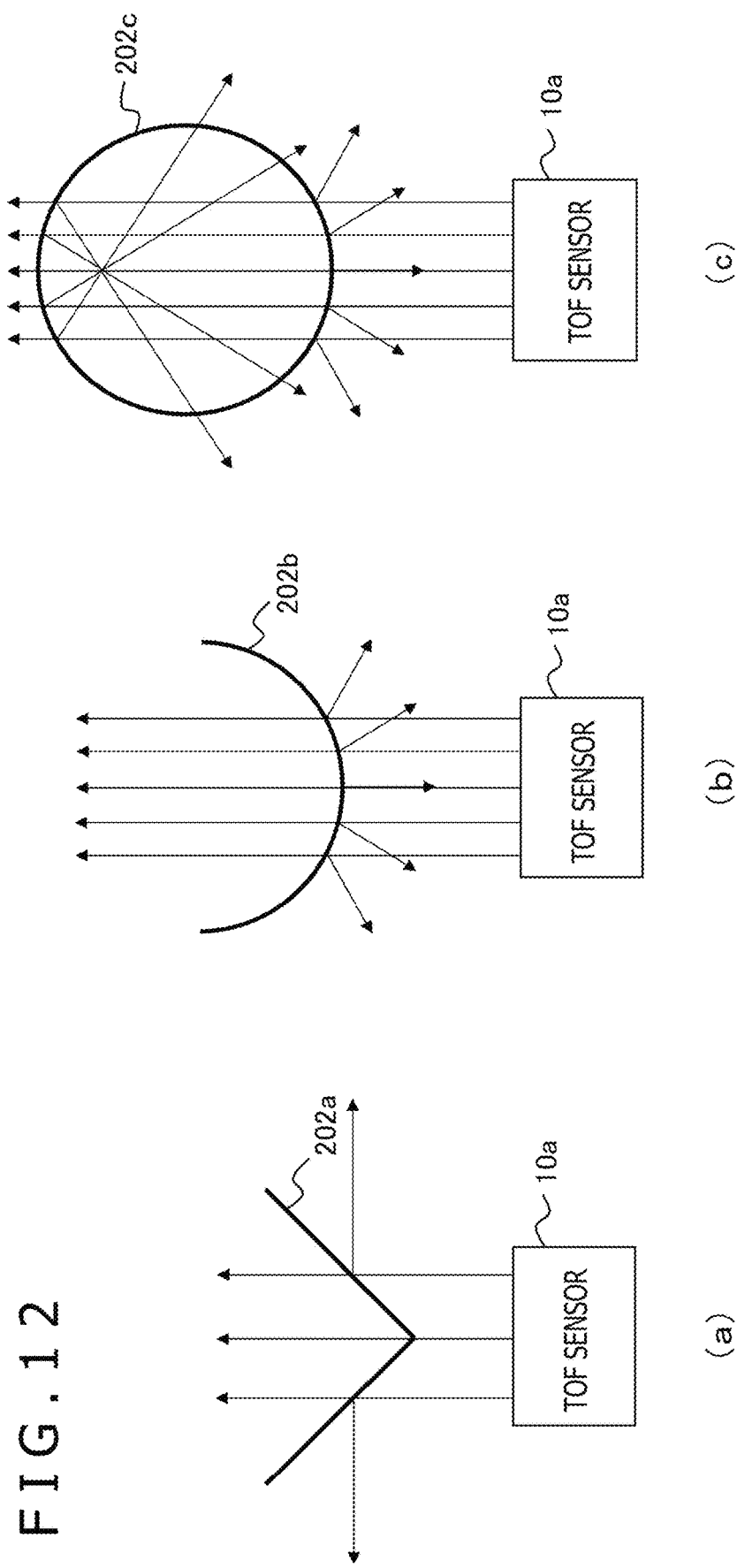
FIG. 12 depicts diagrams illustrating, in cross-sectional view, variations in the shape of a one-way mirror of the second embodiment.

FIG. 12 illustrates, in cross-sectional view, variations in the shape of the one-way mirror 202. In addition, the directions of transmission and reflection of light resulting from each of the shapes are represented by arrows. (a) illustrates a one-way mirror 202a having a plurality of flat surfaces making a predetermined angle. The one-way mirror 202a in (a) has by way of example two flat surfaces making an angle of 90 degrees. The one-way mirror 202a is placed with respect to a front surface of the TOF sensor 10a such that the two flat surfaces are tilted by 45 degrees, which makes it possible to acquire the positions of objects that are present in three directions, or front, right, and left of the TOF sensor 10a, with the transmission light and the reflected light from the one-way mirror 202a.

It should be noted that regarding the objects on the right and left, respective pieces of position information are to be obtained in right and left regions defined by dividing an image capturing surface of the TOF sensor 10a. (b) illustrates a semispherical one-way mirror 202b. In this case, the position of a front object can be acquired with light passing through the one-way mirror 202b, and the position of an object in a different direction can be acquired with reflected light on a pixel-by-pixel basis. A target range of angle is dependent on the size of the one-way mirror 202b relative to the image capturing surface of the TOF sensor 10a.

(c) illustrates a spherical one-way mirror 202c. Also in this case, the position of a front object can be acquired with transmission light from a front surface and a back surface of the one-way mirror 202c, and the position of an object in a different direction can be acquired with reflected light on a pixel-by-pixel basis. In addition, occurrence of reflection on an exterior surface and an interior surface of the one-way mirror 202c makes it possible to acquire the positions of objects that are present in three directions, on a pixel-by-pixel basis. The shape of the one-way mirror of the present embodiment is not limited to illustrated ones, and the one-way mirror may have three or more flat surfaces or may have any curved surface such as a cylindrical surface, a parabolic surface, or a conical surface. In addition, a plurality of one-way mirrors may be placed in the direction of the irradiation light.

Figure 13:
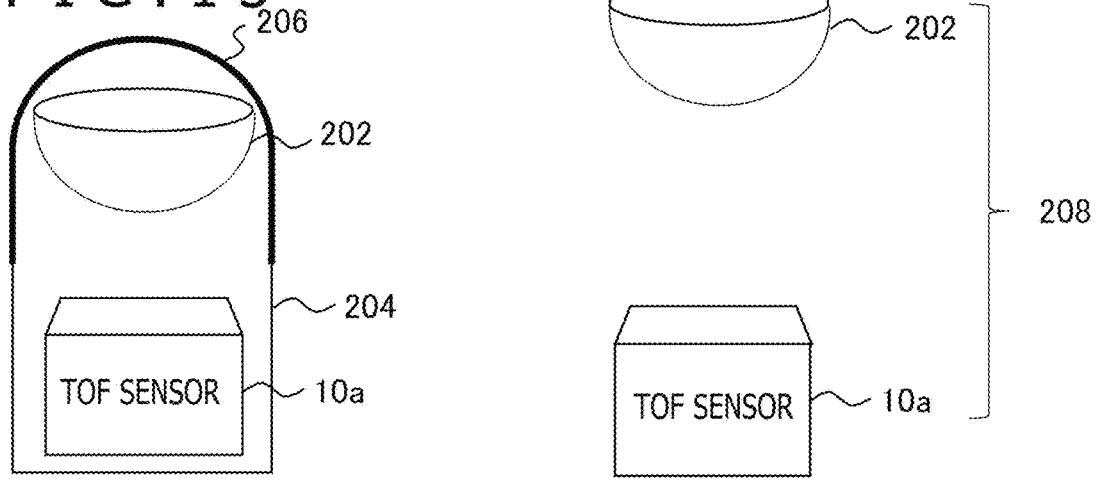
FIG. 13 depicts diagrams each illustrating an installation example of a position information acquisition system where the one-way mirror is introduced in the second embodiment.

FIG. 13 illustrates installation examples of a position information acquisition system where the one-way mirror 202 is introduced. (a) illustrates a position information acquisition device 204, in which the TOF sensor 10a and the one-way mirror 202 are mounted in a single enclosure. (a) illustrates the semispherical one-way mirror 202, which is not intended to be limiting. Out of surfaces of the enclosure, a surface 206, which is included in paths of transmission light and reflected light from the one-way mirror 202, includes a highly transmissive material such as glass or acrylic resin.

The position information acquisition device 204 may be in the form of a controller to be held by a user in use or a part of a head-mounted display. Alternatively, the position information acquisition device 204 may be attached to a back or side surface of an automobile to cause the irradiation light to reach an object located at a blind spot. In any case, a position relation and postures of the TOF sensor 10a and the one-way mirror 202 inside the position information acquisition device 204 are fixed, which makes it possible to acquire in advance the path of light to be observed at each pixel. This enables determining, from the path length of light obtained on the basis of a local maximum point of a degree of photons, the position of an object, or the source.

(b) illustrates a position information acquisition system 208, in which the one-way mirror 202 and the TOF sensor 10a are separated from each other. In this case, the one-way mirror 202 assumes the role of a probe. In other words, the one-way mirror 202 can be placed at or moved to a desired location unless an obstacle is present between the one-way mirror 202 and the TOF sensor 10a to block the irradiation light or the reflected light. The one-way mirror 202 is reduced in weight as compared with being integrated with the TOF sensor 10a as in (a), so that another way of use is possible; for example, the one-way mirror 202 is mounted alone on a drone or a head-mounted display.

In a case where the position and/or the posture of the one-way mirror 202 is variable, the TOF sensor 10a first detects the one-way mirror 202. For example, the one-way mirror 202 includes a matte material containing a large amount of a diffuse reflection component, which makes it possible for the TOF sensor 10a to capture a picture in the color of the one-way mirror 202 irrespective of the irradiation light. Accordingly, an image sensor including a trichromatic filter is used as the TOF sensor 10a. The TOF sensor 10a then acquires a picture of the one-way mirror 202 and acquires, on the basis of the size of the one-way mirror 202 and the position of the one-way mirror 202 in an image plane, information regarding the position and/or the posture of the one-way mirror 202 itself.

With the position and/or the posture of the one-way mirror 202 being found, the path of light observed at each pixel in the TOF sensor 10a is found, which makes it possible to determine, from the path length of light obtained on the basis of a local maximum point of the degree of photons, the position of an object, or the source. It should be noted that, in the present embodiment as well as FIG. 13, a member combined with the TOF sensor 10a is not limited to a one-way mirror. In other words, any member, without limitation to a one-way mirror, allows for obtaining similar information as long as the member is capable of distributing the irradiation light from the TOF sensor 10a in a plurality of directions and concentrating the light reflected by an object that is present in each direction onto the light receiver of the TOF sensor 10a.

At this time, the irradiation light may simultaneously be distributed in the plurality of directions as by the one-way mirror, or the irradiation direction may be changed with time to perform distribution with a predetermined period as by a later-described photochromatic mirror. For example, a typical mirror, lens, or the like may be used with the orientation of a surface or the refractive index thereof being periodically changed. Description will be made below on, as representative examples of such an irradiation light distribution member, a one-way mirror and a photochromatic mirror, each of which can be replaced with another member, if necessary.

Figure 14:
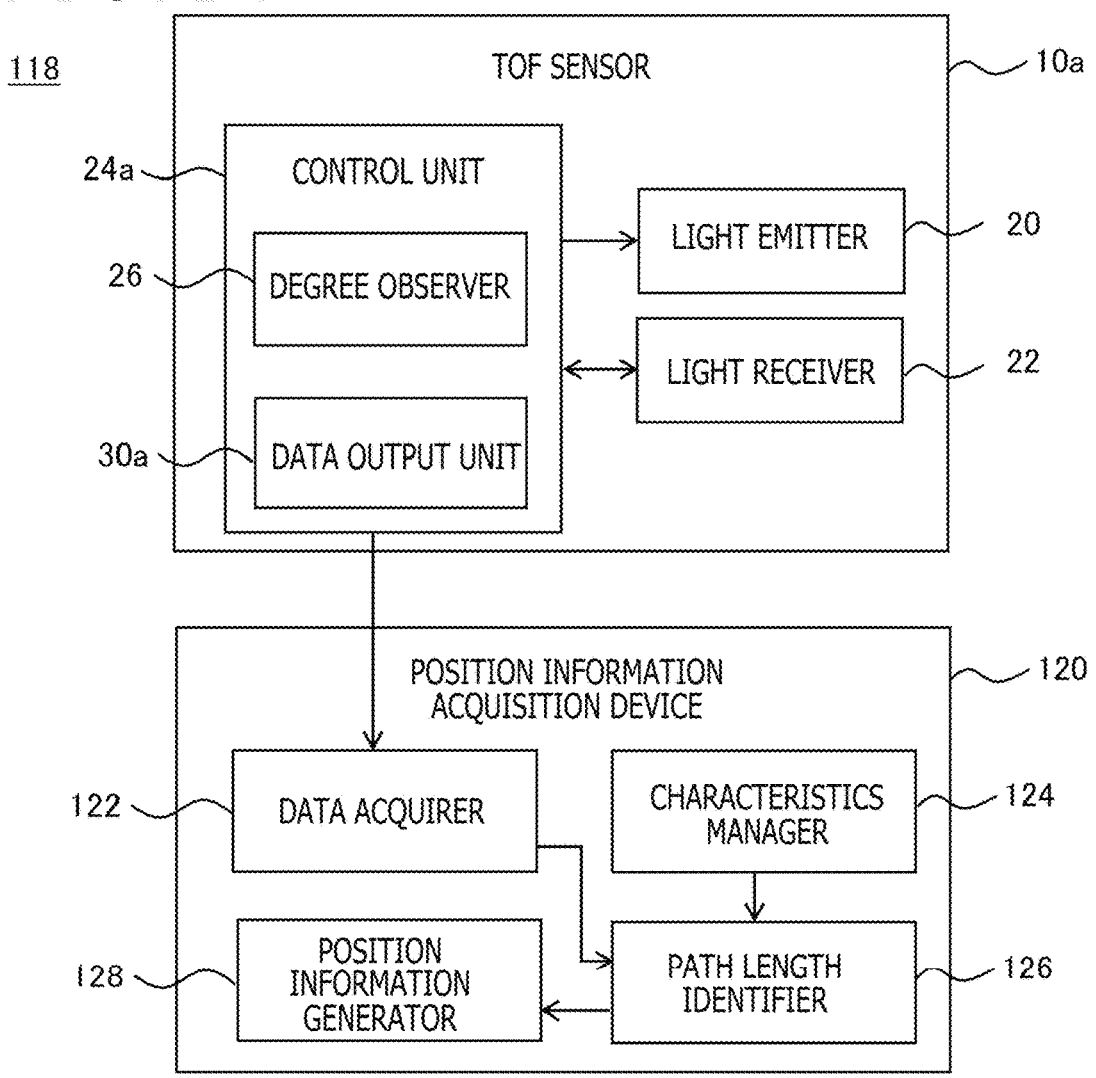
FIG. 14 is a diagram illustrating a configuration of a functional block of a position information acquisition system that acquires in parallel position information regarding objects that are present in a plurality of directions in the second embodiment.

FIG. 14 illustrates a configuration of a functional block of a position information acquisition system that acquires in parallel position information regarding objects that are present in a plurality of directions. A position information acquisition system 118 includes the TOF sensor 10a and a position information acquisition device 120. Here, while connected to the TOF sensor 10a for communication, the position information acquisition device 120 is, in an aspect as described later, also connected to the one-way mirror 202 to control an application voltage. The position information acquisition device 120 may be included in the control unit 50 of the head-mounted display 100 illustrated in FIG. 7 or, in addition to that, may be a part of one of various information processing devices such as a game device. Alternatively, at least a part of the position information acquisition device 120 may be provided inside the TOF sensor 10a.

The light emitter 20, the light receiver 22, and the degree observer 26 of the TOF sensor 10a have functions similar to those illustrated in FIG. 3. A data output unit 30a of a control unit 24a outputs data indicating a change in a degree of photons observed on a pixel-by-pixel basis to the position information acquisition device 120. As described above, by virtue of the introduction of the one-way mirror, path lengths to objects in a plurality of directions can be obtained on the basis of a local maximum point of a degree of photons observed at each pixel. However, as illustrated in FIG. 11, with merely the path lengths where local maximum points appear being obtained, it cannot be found which one of the objects that are present in the directions (for example, the object A, the object B) corresponds to each of the path lengths.

Accordingly, the position information acquisition device 120 identifies the path lengths, thereby determining a correspondence between each of the objects present in the plurality of directions and the path length thereto. The position information acquisition device 120 includes a data acquirer 122, a characteristics manager 124, a path length identifier 126, and a position information generator 128. The data acquirer 122 acquires data indicating a change in a degree of photons from the TOF sensor 10a on a pixel-by-pixel basis. Alternatively, the value itself of a path length where a local maximum point of the degree appears may be acquired. The data includes, for example, the path lengths $D_A$ and $D_B$ illustrated in (b) in FIG. 11, or the like. However, at this point of time, it is unknown which one of the objects each of the path lengths is from.

The characteristics manager 124 manages the transmittance and the reflectance of the one-way mirror 202. Assuming that t (0<t<1) denotes the transmittance of the one-way mirror 202, a reflectance r is (1−t). Here, a difference between the transmittance and the reflectance of the one-way mirror 202 equal to or more than a predetermined value results in a difference in intensity between transmission light and reflected light and, consequently, makes it possible to clearly differentiate local maximum values of the degree of photons. In this case, the characteristics manager 124 has a role in storing the transmittance and the reflectance of the one-way mirror 202 formed in advance in such a manner.

Alternatively, the transmittance and the reflectance of the one-way mirror 202 may be caused to temporally change as described later. In this case, the characteristics manager 124 controls an application voltage to the one-way mirror 202, thereby causing the transmittance and the reflectance to temporally change. It should be noted that, in a case where a photochromatic mirror is used in place of the one-way mirror 202, the characteristics manager 124 switches between a transparent state where the transmittance t=1 (the reflectance r=0) and a mirror state where the transmittance t=0 (the reflectance r=1) by application of a voltage.

The path length identifier 126 determines, on the basis of the difference between the transmittance and the reflectance of the one-way mirror or a temporal change therein, which one of the transmission light and the reflected light is represented by the local maximum point of the degree of photons and, consequently, which one of the objects that are present in the directions corresponds thereto. The position information generator 128 generates and outputs position information regarding the object on the basis of the identified paths of the transmission light and the reflected light and the path length of light to the object obtained from the local maximum point of the degree of photons. The position information generator 128 generates, for example, a depth image in the direction of the object A and a depth image in the direction of the object B in the environment in FIG. 11. A destination to output the data may be a module that performs information processing by using the depth images, or may be a storage or the like.

FIG. 15 is a diagram for explaining the principle of identifying a local maximum point of a degree of photons by making a difference of a predetermined value or more between the transmittance t and the reflectance r of the one-way mirror 202. Assuming that E denotes the intensity of the irradiation light, t denotes the transmittance of the one-way mirror 202, and r (=1−t) denotes the reflectance thereof, the light reflected by the object A passes through the one-way mirror 202 twice and the light reflected by the object B is reflected by the one-way mirror 202 twice, so that respective intensities $R_A$ and $R_B$ of the reflected light entering the TOF sensor 10a are as follows.

$$R_A = E * t^2$$

$$R_B = E * r^2$$

Thus, by virtue of appropriately setting the transmittance t and the reflectance r, the intensities $R_A$ and $R_B$ can intendedly be differentiated. In the illustrated example, the thicknesses of arrows representing paths of light represent that the one-way mirror 202 with the reflectance r that is larger than the transmittance t by a predetermined value or more is used. In this case, the degree of photons from the object B reached by the reflected light becomes significantly large as compared with that of photons from the object A reached by the transmission light, as in illustrated in (b).

Accordingly, the path length identifier 126 associates the path length where the larger local maximum point appears with the object B reached by the reflected light, and associates the path length where the smaller local maximum point appears with the object A reached by the transmission light. Inversion of the magnitude relation between the transmittance and the reflectance, needless to say, results in inversion of the magnitude relation between the local maximum values. It should be noted that, in a case where there is a single local maximum point, the path length identifier 126 determines that the object A and the object B are at the same path length. In addition, the local maximum points of the two types of light, that is, the light passing through twice and the light reflected twice, are identified in this example. However, a one-way mirror in a shape that may cause both transmission and reflection to be included in a path of light as illustrated in (c) in FIG. 12 enables identification of local maximum points of three or more types of light.

Figure 16:
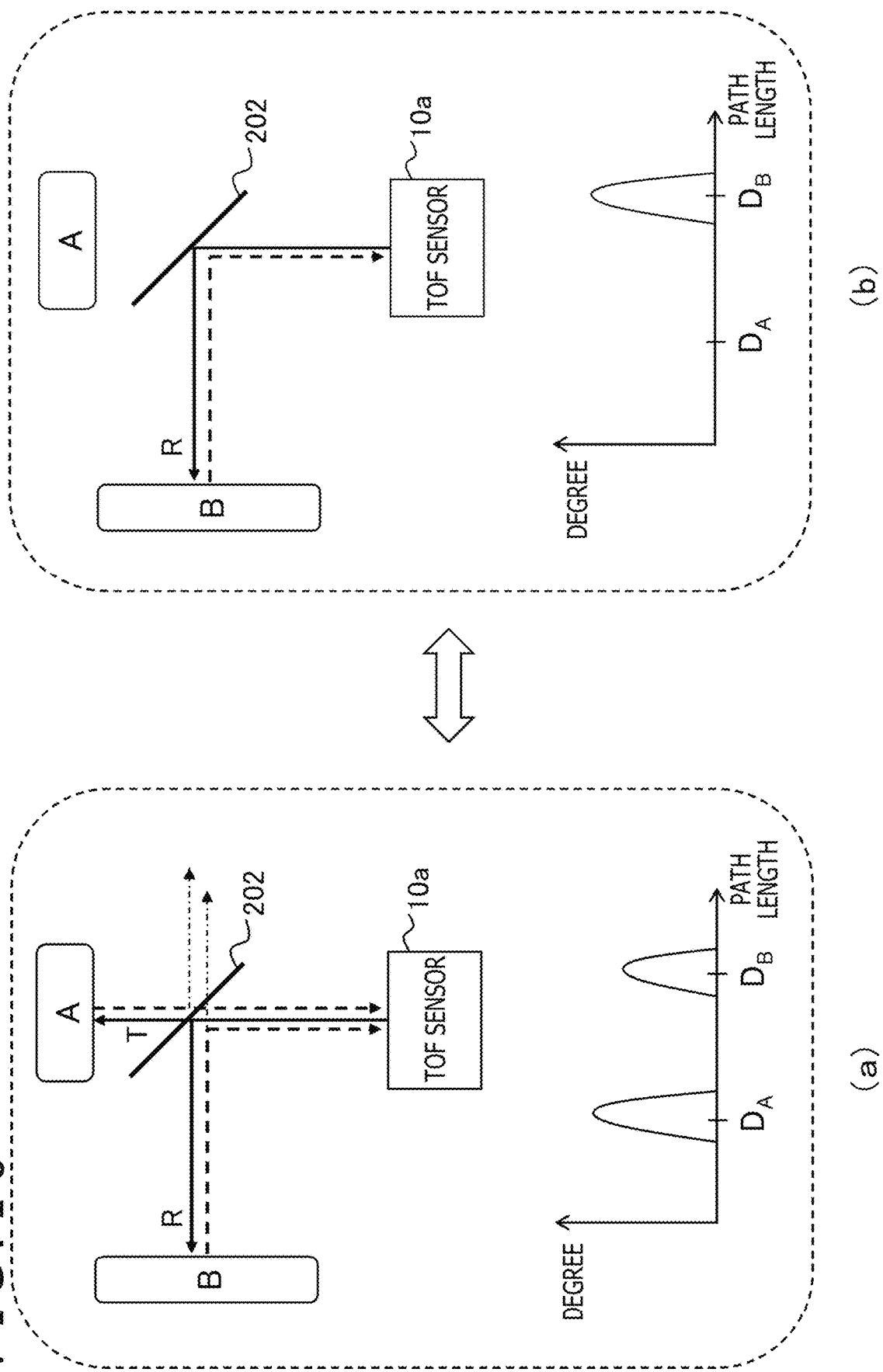
FIG. 16 is a diagram for explaining a technique for identifying a local maximum point of a degree of photons by temporally changing the transmittance and the reflectance of the one-way mirror in the second embodiment.

FIG. 16 is a diagram for explaining a technique for identifying a local maximum point of a degree of photons by temporally changing the transmittance and the reflectance of the one-way mirror 202. For example, the characteristics manager 124 causes a state where the transmittance of the one-way mirror 202 is not zero as in the upper tier in (a) and a state where the transmittance is zero as in the upper tier in (b) to alternately occur. A photochromatic film with transmittance that changes in response to application of a voltage has been put into practical use for a window, a partition, and the like (for example, see Japanese Patent Laid-Open No. 2019-28387). In the present embodiment, for example, a photochromatic film is stuck on a back surface of the one-way mirror 202 (a surface opposite to the TOF sensor 10a), and the characteristics manager 124 periodically applies a voltage to change the transmittance.

The state of (a) is similar to that described so far, and a local maximum point corresponding to the object A reached by the transmission light and a local maximum point corresponding to the object B reached by the reflected light are observed in the degree of photons as illustrated in the lower tier in (a). In contrast, in the state of (b), only a local maximum point corresponding to the object B reached by the reflected light is observed as illustrated in the lower tier. The characteristics manager 124 maintains one of the states until the time at which at least the irradiation light enters the TOF sensor 10a after traveling over a measurement upper limit of the path length, and then switches to the other state. A switching cycle is set in advance.

The path length identifier 126 acquires a change of the local maximum points in synchronization with the switching of the state by the characteristics manager 124, checking whether or not any local maximum point disappears. The path length identifier 126 then associates a path length where the disappearing local maximum point appears with the object A reached by the transmission light. Needless to say, a local maximum point that constantly appears without disappearing is associated with the object B reached by the reflected light.

In a case where data regarding a path length where a local maximum point appears is directly acquired from the TOF sensor 10a, the path length identifier 126 determines a path length no data regarding of which is obtained depending on a timing, as a path length to the object A reached by the transmission light. It should be noted that the characteristics manager 124 may change the transmittance of the one-way mirror 202 in a plurality of steps by, for example, controlling an application voltage. In this case, the path length identifier 126 determines a path length where a local maximum value of the degree of photons decreases according to a decrease in the transmittance, as a path length to the object A reached by the transmission light.

Figure 17:
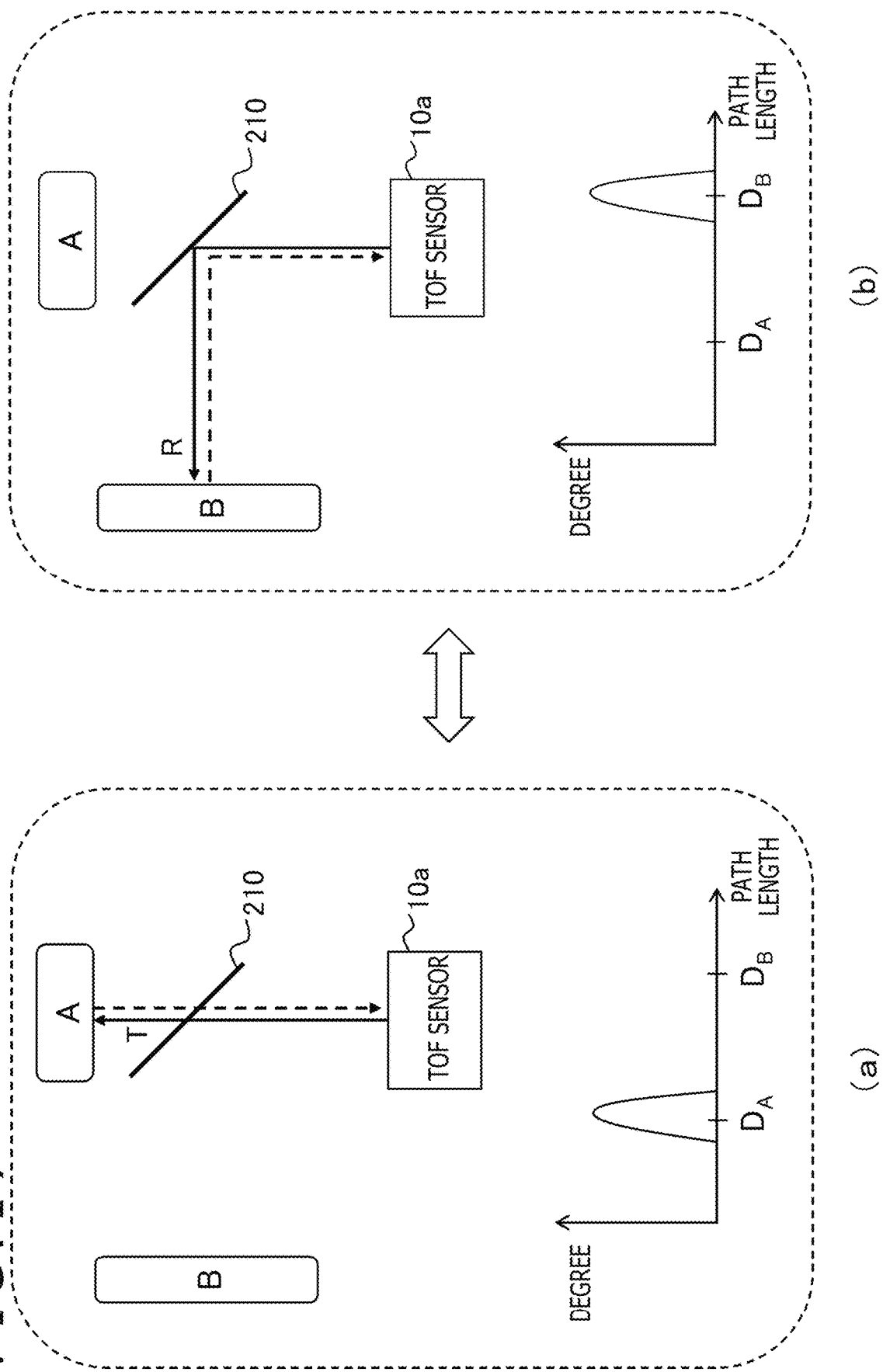
FIG. 17 is a diagram for explaining a technique for identifying a local maximum point of a degree of photons by temporally changing the state of a photochromatic mirror in the second embodiment.

FIG. 17 is a diagram for explaining a technique for identifying a local maximum point of a degree of photons by temporally changing the state of a photochromatic mirror. As described above, the photochromatic mirror is a member that can be switched between a transparent state and a mirror state (for example, see Japanese Patent Laid-Open No. 2009-103936) The characteristics manager 124 controls an application voltage to the photochromatic mirror 210, thereby causing a transparent state as that in the upper tier in (a) and a mirror state as that in the upper tier in (b) to alternately occur.

Here, the "transparent state" only has to be a state that satisfies a predetermined condition under which it is considered as being transparent (a first state); for example, the transmittance is within a predetermined range from one. In addition, the "mirror state" only has to be a state that satisfies a predetermined condition under which mirror reflection is considered as being performed (a second state); for example, the reflectance is within a predetermined range from one. In the state of (a), only a local maximum point corresponding to the object A reached by the transmission light is observed in the degree of photons illustrated in the lower tier. In the state of (b), only a local maximum point corresponding to the object B reached by the reflected light is observed.

The characteristics manager 124 maintains one of the states until the time at which at least the irradiation light enters the TOF sensor 10a after traveling over a measurement upper limit of the path length, and then switches to the other state. A switching cycle is set in advance. The path length identifier 126 acquires a change of the local maximum point in synchronization with the switching of the state by the state characteristics manager 124 and determines the local maximum point appearing in each of the states, as the one representing the path length to the object in the direction reached by the irradiation light.

In this aspect, since only a single local maximum point always appears, the TOF sensor 10a is not limited to a dTOF sensor and may be an iTOF sensor that derives a distance on the basis of a phase difference between irradiation light and reflected light or a visible light stereo camera. A technique including extracting correspondence points between images captured from right and left different points of view by a stereo camera and obtaining a distance to a target from an offset amount therebetween in accordance with the principle of triangulation has been widely known. Even the use of the above means enables acquiring position information regarding objects that are present in a plurality of directions from a temporal change of the state of the photochromatic mirror 210.

Figure 18:
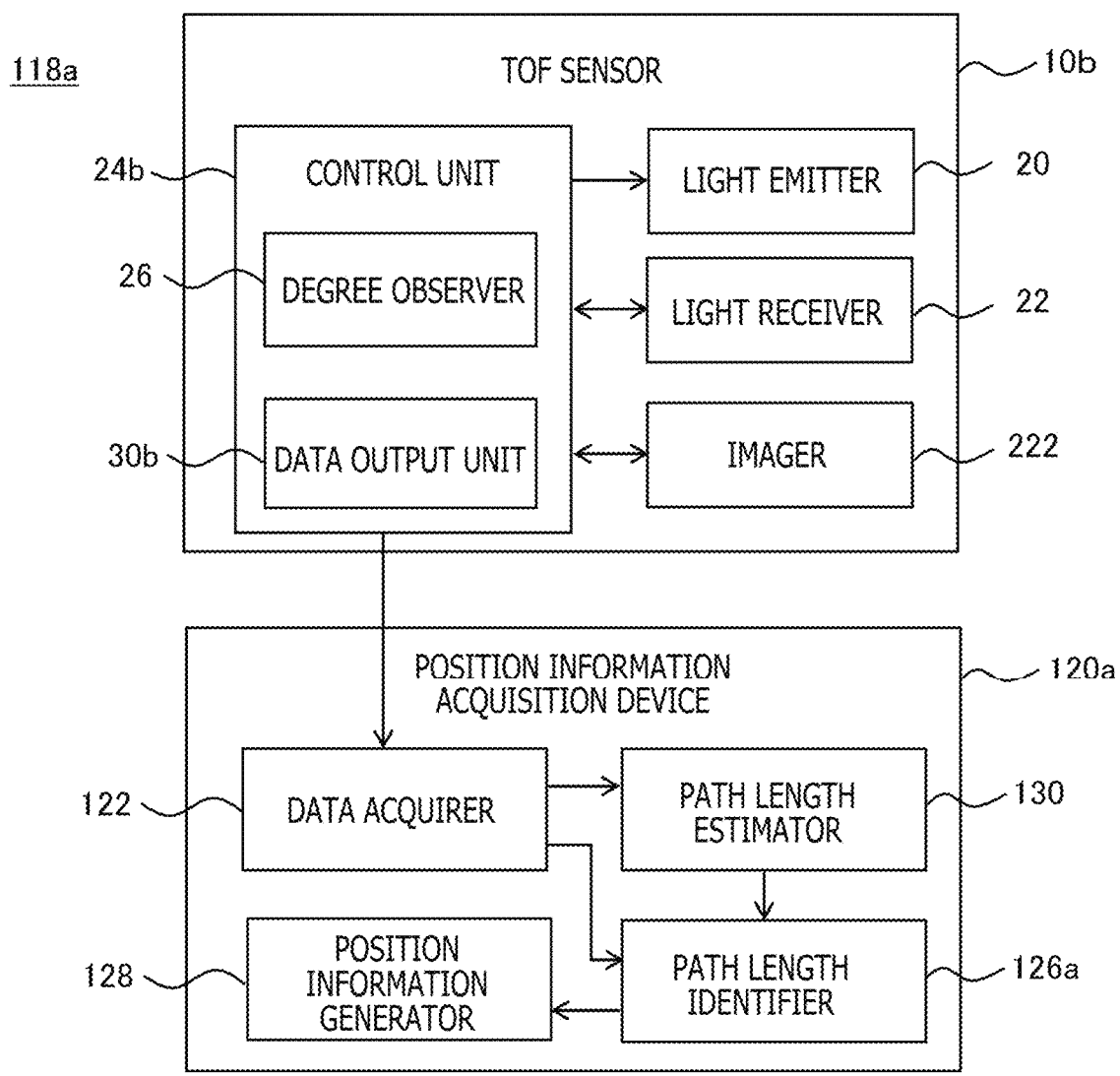
FIG. 18 is a diagram illustrating another example of the functional block configuration of the position information acquisition system that acquires in parallel position information regarding objects that are present in a plurality of directions in the second embodiment.

FIG. 18 illustrates another example of the functional block configuration of the position information acquisition system that acquires in parallel position information regarding objects that are present in a plurality of directions. A position information acquisition system 118*a* includes a TOF sensor 10*b* and a position information acquisition device 120*a*. A basic role of the position information acquisition device 120*a* is similar to those of the position information acquisition device 120 in FIG. 14. Meanwhile, the position information acquisition device 120*a* roughly estimates path lengths to objects that are present in a plurality of directions, by means other than dTOF described so far, and identifies, on the basis of a magnitude relation between the estimated path lengths, a result obtained from a local maximum point of a degree of photons.

Accordingly, the TOF sensor 10*b* includes an imager 222 that captures a typical color image or a color polarization image, in addition to a function to observe light that is irradiation light reflected by an object. An image sensor that can acquire both a near-infrared image and a color image and a polarization camera that includes a polarizer layer located in an upper layer of a color filter and thus is allowed to capture a color polarization image have been widely known. FIG. 18 illustrates the light receiver 22 and the imager 222 being separate from each other, but they may be provided by the same light receiving element. Alternatively, as long as a correspondence relation between an angle of view and a position of the array of light receiving elements of the TOF sensor is found, a typical RGB camera or polarization camera may be introduced in addition to the TOF sensor 10*b*.

The light emitter 20, the light receiver 22, and the degree observer 26 of the TOF sensor 10*b* have functions similar to those illustrated in FIG. 3. A data output unit 30*b* of a control unit 24*b* outputs, to the position information acquisition device 120*a*, data indicating a change in a degree of photons observed on a pixel-by-pixel basis or the value of a path length where a local maximum point appears. The data output unit 30*b* also outputs data regarding a color image or a polarization color image captured by the imager 222 to the position information acquisition device 120*a*.

The data acquirer 122 and the position information generator 128 of the position information acquisition device 120*a* have the same functions as those illustrated in FIG. 14. By using the captured color image or polarization color image, the path length estimator 130 estimates a path length to a subject. Specifically, the path length estimator 130 separates a picture provided by light that has passed through the one-way mirror 202 and a picture provided by light that has been reflected thereby from each other and then estimates respective "distances" to the subject. Although the "distance" obtained from the picture formed by reflection on the one-way mirror 202 refers to a path length of light in the strict sense as described so far, a typical distance acquisition technology is applicable for processing. Here, a CNN (Convolution Neural Network), which is known as a technology for image recognition in the field of deep learning, is used.

The path length identifier 126*a* identifies which one of the directions is represented by the path length where the local maximum point appears in the degree of photons, on the basis of the magnitude relation between path lengths estimated by the path length estimator 130. In other words, since the path lengths estimated by the path length estimator 130 are to be used for identification of a path length based on a degree of photons, estimation values may contain a certain amount of error as long as at least a magnitude relation can be found. Accordingly, the path length estimator 130 only has to estimate approximate path lengths by a CNN.

Figure 19:
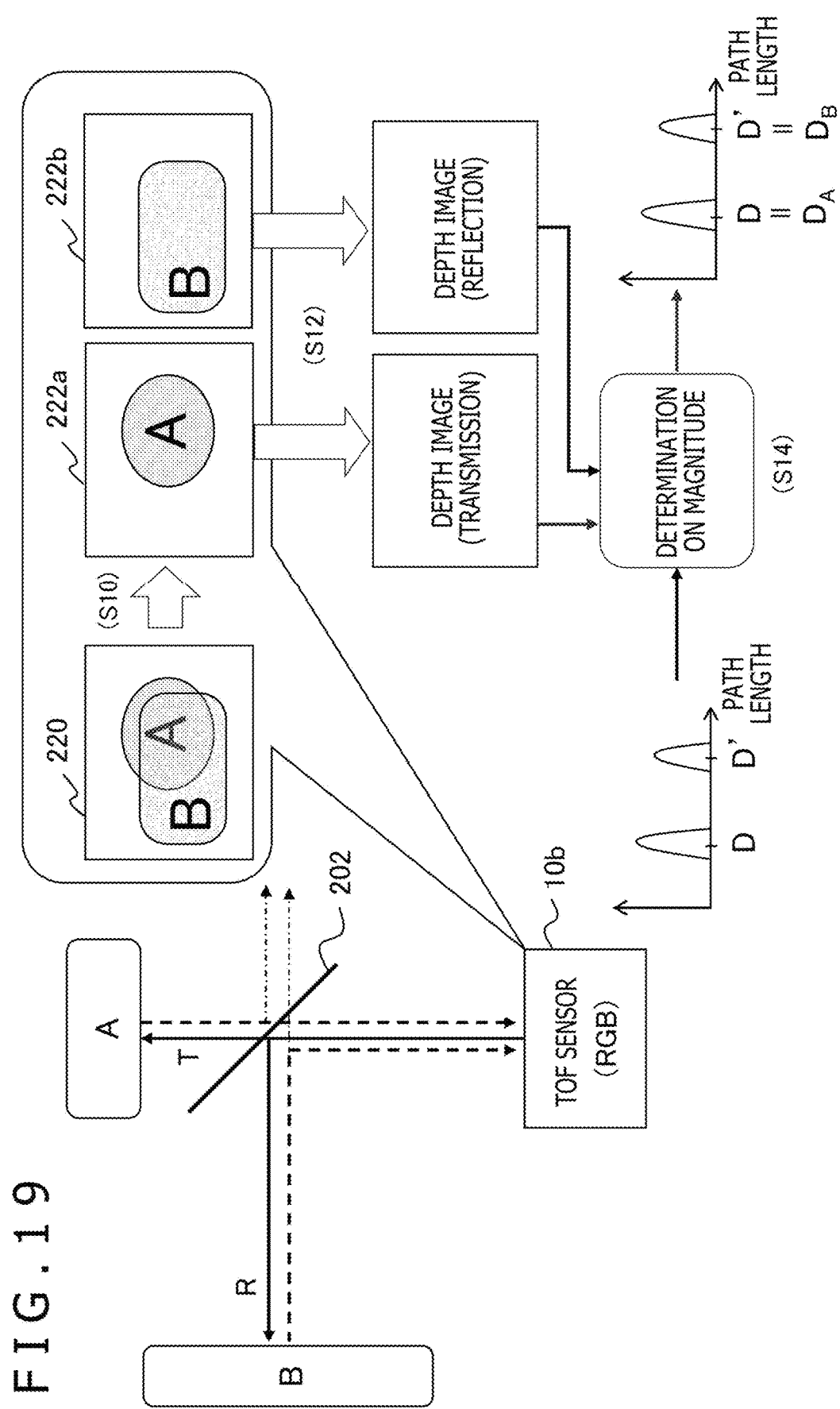
FIG. 19 is a diagram for explaining a technique for identifying a local maximum point of a degree of photons by estimating a path length with use of a color image in the second embodiment.

FIG. 19 is a diagram for explaining a technique for identifying a local maximum point of a degree of photons by estimating a path length with use of a color image. Here, the imager 222 of the TOF sensor 10*b* captures a color image 220. In this example, in the color image 220, a picture of the object A that has passed through the one-way mirror 202 and a picture of the object B that has been reflected by the one-way mirror 202 appear in such a manner that the pictures overlap. Accordingly, the path length estimator 130 first separates the color image 220 into an image 222*a* of the transmission light and an image 222*b* of the reflected light (S10).

Regarding studies about a CNN, a variety of techniques for separating an image captured through a window glass or the like into a picture of transmission light and a picture of reflected light have been proposed, and the present embodiment may employ any one of them (for example, see Qingnan Fan, et. al., "A Generic Deep Architecture for Single Image Reflection Removal and Image Smoothing," Proceedings of the IEEE International Conference on Computer Vision (ICCV), 2017, pp. 3238-3247). The path length estimator 130 further acquires a depth image from each of the separated images (S12). For this process, a conventional technique for generating a depth image from a captured image by a CNN is also usable (for example, see Ravi Garg, et. al., "Unsupervised CNN for Single View Depth Estimation: Geometry to the Rescue," Proceedings of Computer vision—ECCV 2016, 2016, pp. 740-756).

The path length identifier 126*a* compares the depth images of the transmission light and the reflected light and acquires a magnitude relation between the estimated distances (path lengths) on a pixel-by-pixel basis. The path length identifier 126*a* then identifies local maximum points of a degree of photons obtained with respect to the corresponding pixel or path lengths D and D' represented thereby, on the basis of the magnitude relation (S14). For example, in a case where a path length to the object A indicated by the depth image of the transmission light is smaller than a path length to the object B indicated by the depth image of the reflected light, the smaller path length D is associated with the object A, and the larger path length D' is associated with the object B, as illustrated. Thus, by virtue of deriving a final path length on the basis of the degree of photons, position information regarding objects that are present in a plurality of directions can be obtained with a higher accuracy than by estimation by a CNN.

The imager 222 of the TOF sensor 10*b* may capture a color polarization image as described above. For example, with polarizers including fine wire grids being located in an upper layer of an imaging element at principal axis angles of 0 degrees, 45 degrees, 90 degrees, and 135 degrees, light that has passed through the polarizers and a color filter is converted to a charge and read, which makes it possible to obtain polarization images from four directions as a color image (for example, see Japanese Patent Laid-Open No. 2012-80065). In this case, the color image 220 is obtained as a four-direction polarization image.

The luminance of polarized light usually changes in the form of a sine wave with respect to the angle of a polarizer, and the minimum value of the luminance represents a diffuse reflection component. Accordingly, the path length estimator 130 acquires a change in luminance relative to the polarization direction of the color polarization image on a pixelby-pixel basis and defines the minimum value thereof as a pixel value to generate an image of a diffuse reflection component. A technique using a polarization image to generate an image from which a specular reflection component is removed in such a manner has been known (for example, see PCT Patent Publication No. WO2016/136085). In other words, this image corresponds to the image 222a of the transmission light.

Further, the path length estimator 130 subtracts the image 222a of the transmission light from the unpolarized color image 220, which is provided by adding the four-direction polarization images together, thereby acquiring the image 222b of the reflected light. The subsequent process may be similar to the above-described one performed in the case where a color image is used. Thus, the use of a polarization image also makes it possible to identify which one of path lengths to objects that are present in the directions is represented by a local maximum point of a degree of photons.

According to the present embodiment described above, a member capable of transmission and reflection of irradiation light from a TOF sensor or light from an object is introduced to acquire in parallel the positions of objects that are present in a plurality of directions. For example, a dTOF sensor and a one-way mirror are combined, and the irradiation light is separated into transmission light and reflected light by the one-way mirror. Then, reflected light from objects in different directions where the transmission light and the reflected light reach is observed as a change in a degree of photons during a predetermined duration of time. A time point at which a local maximum point of the degree appears is detected, which makes it possible to simultaneously acquire path lengths of light to the objects in the different directions and, consequently, the positions of the objects. Here, it can be determined which one of the objects in the directions corresponds to the local maximum point of photons, by controlling the transmittance and reflectance of the one-way mirror.

In addition, the present embodiment can be implemented as a device including means for causing a path of light to change, such as a one-way mirror, and a TOF sensor in an integrated manner, or can include the means independently of the TOF sensor such that position information regarding objects that are present in a plurality of directions can be obtained after the TOF sensor detects the position and the posture of the means. Further, a variety of directions to acquire position information can be set depending on the shape of the means. As a result, position information regarding a variety of objects can easily be acquired in a diversity of environments, which makes it possible to significantly increase the range of uses of the TOF sensor.

Hereinabove, the present invention is described on the basis of the embodiments. The above-described embodiments are by way of example, and it should be understood by those skilled in the art that various modification examples of combinations of the components and processing processes thereof are possible and such modification examples are also within the scope of the present invention.

REFERENCE SIGNS LIST

10: TOF sensor
20: Light emitter
22: Light receiver
24: Control unit
26: Degree observer
28: Distance acquirer
30: Data output unit
50: Control unit
70: Captured image acquirer
72: Position/posture acquirer
74: Display image acquirer
76: Warning control unit
78: Output unit
100: Head-mounted display
110: Stereo camera
118: Position information acquisition system
120: Position information acquisition device
122: Data acquirer
124: Characteristics manager
126: Path length identifier
128: Position information generator
130: Path length estimator
202: One-way mirror
204: Position information acquisition device
208: Position information acquisition system
210: Photochromatic mirror
222: Imager

INDUSTRIAL APPLICABILITY

As described hereinabove, the present invention is applicable to various devices such as a TOF sensor, a position information acquisition device, an information processing device, a game device, a content processing device, and a head-mounted display and systems including them.

The invention claimed is:

1. A position information acquisition device comprising:
a degree observer configured to acquire a temporal change in a degree of photons resulting from a pulsed irradiation light being reflected by an object;
a distance acquirer configured to detect a local maximum point in the temporal change in the degree and acquire a distance to the object on a basis of a time point at which the local maximum point appears; and
a data output unit configured to output information regarding the distance, wherein
the distance acquirer is configured to exclude, with reference to a maximum value among a plurality of the local maximum points detected in the temporal change of the degree, the local maximum point that is less than a predetermined proportion of the maximum value from a target for distance acquisition.

2. The position information acquisition device according to claim 1, wherein
the distance acquirer is configured to acquire, when detecting a plurality of the local maximum points in the temporal change of the degree, the distance corresponding to each of the local maximum points, and
the data output unit is configured to output, as a value of a pixel corresponding to a light receiving element, a plurality of distance values in an associated manner.

3. The position information acquisition device according to claim 1, wherein
the degree observer is configured to acquire the temporal change in the degree for each of two-dimensionally arranged light receiving elements, and
in detecting, in an image plane including pixels corresponding to the respective light receiving elements, the local maximum point appearing at one of the pixels, the distance acquirer is configured to exclude, with reference to a value of the local maximum point in the temporal change in the degree appearing at another pixel substantially at a same time, the local maximum point that is less than a predetermined proportion of the value from a target for distance acquisition.

4. The position information acquisition device according to claim 1, wherein the data output unit is configured to output information indicating presence of a transmissive object on a basis of the number of the local maximum points or a value of the local maximum point.

5. The position information acquisition device according to claim 1, wherein the distance acquirer is configured to determine the local maximum point corresponding to a non-transmissive object on a basis of information regarding a distance of a real space registered in advance and detect, with reference to the local maximum point, the local maximum point corresponding to the non-transmissive object.

6. The position information acquisition device according to claim 5, wherein the distance acquirer is configured to estimate a distance to a floor on a basis of, as the information regarding the distance of the real space, a height of a user who wears a head-mounted display in which the position information acquisition device is mounted and define the local maximum point corresponding to the distance as a reference.

7. A head-mounted display comprising:
a position information acquisition device including
a degree observer configured to acquire a temporal change in a degree of photons resulting from a pulsed irradiation light being reflected by an object,
a distance acquirer configured to detect a local maximum point in the temporal change in the degree and acquire a distance to the object on a basis of a time point at which the local maximum point appears, and
a data output unit configured to output information regarding the distance,
the distance acquirer being configured to exclude, with reference to a maximum value among a plurality of the local maximum points detected in the temporal change of the degree, the local maximum point that is less than a predetermined proportion of the maximum value from a target for distance acquisition; and
a display panel configured to acquire, from the data output unit, information regarding a distance to an object in a field of vision corresponding to an orientation of a face of a user and display, on a basis of the information, a result of applying an independent process to each of a transmissive object and a non-transmissive object that overlap in the field of vision.

8. The head-mounted display according to claim 7, further comprising:
a control unit configured to detect that the non-transmissive object gets close and cause the display panel to display a warning.

9. A position information acquisition method comprising:
acquiring a temporal change in a degree of photons resulting from a pulsed irradiation light being reflected by an object;
detecting a local maximum point in the temporal change in the degree and acquiring a distance to the object on a basis of a time point at which the local maximum point appears; and
outputting information regarding the distance,
wherein the acquiring the distance includes excluding, with reference to a maximum value among a plurality of the local maximum points detected in the temporal change of the degree, the local maximum point that is less than a predetermined proportion of the maximum value from a target for distance acquisition.

* * * * *